US012583245B2

(12) United States Patent
Ji et al.

(10) Patent No.: US 12,583,245 B2
(45) Date of Patent: Mar. 24, 2026

(54) METHOD AND DEVICE FOR PRINTING REFLECTING LAYER OF BACKLIGHT PANEL

(71) Applicant: enovate3D (Hangzhou) Technology Development Co., Ltd., Hangzhou (CN)

(72) Inventors: Xiang Ji, Hangzhou (CN); Enyi Xu, Hangzhou (CN); Libo Ru, Hangzhou (CN); Lvxun Lu, Hangzhou (CN); Hangchao Cao, Hangzhou (CN)

(73) Assignee: enovate3D (Hangzhou) Technology Development Co., Ltd., Hangzhou (CN)

( * ) Notice: Subject to any disclaimer, the term of this patent is extended or adjusted under 35 U.S.C. 154(b) by 229 days.

(21) Appl. No.: 18/273,204

(22) PCT Filed: Oct. 28, 2022

(86) PCT No.: PCT/CN2022/128157
§ 371 (c)(1),
(2) Date: Jul. 25, 2023

(87) PCT Pub. No.: WO2023/231287
PCT Pub. Date: Dec. 7, 2023

(65) Prior Publication Data
US 2024/0391235 A1     Nov. 28, 2024

(30) Foreign Application Priority Data
Jun. 1, 2022     (CN) .......................... 202210611440.5

(51) Int. Cl.
*B41J 29/393*          (2006.01)
*B41J 2/045*           (2006.01)
(Continued)

(52) U.S. Cl.
CPC ......... *B41J 29/393* (2013.01); *B41J 2/04593* (2013.01); *B41J 3/407* (2013.01);
(Continued)

(58) Field of Classification Search
CPC ....................................................... B41J 2/2125
See application file for complete search history.

(56) References Cited

U.S. PATENT DOCUMENTS 6,109,719 A * 8/2000 Cornell ................ B41J 2/04563
347/14
2003/0223794 A1* 12/2003 Shirota ................ B41J 11/0095
400/55
(Continued)

FOREIGN PATENT DOCUMENTS

CN          1524699          9/2004
CN          110505926        11/2019
(Continued)

OTHER PUBLICATIONS

Machine generated English translation of JP2014158011A to Kojima et al., "Production Method of LED Device"; retrieved via worldwide. espacenet.com on May 1, 2025; 36pp.*

*Primary Examiner* — Shelby L Fidler
(74) *Attorney, Agent, or Firm* — Olive Law Group, PLLC

(57) ABSTRACT

The embodiment of the present disclosure provides a method and device for printing a reflecting layer of a backlight panel. The method includes performing first correction processing on at least two piezoelectric injection valves firstly, then acquiring specification parameters of the backlight panel, generating moving paths of the at least two piezoelectric injection valves according to the specification parameters of the backlight panel, and controlling the corrected piezoelectric injection valves to print according to the moving paths. The reflecting layer is printed by controlling the piezoelectric injection valves to achieve stepless change (Continued)

Mark point

LED

Calibration line in the plane Y-axis direction

Calibration line in the plane X-axis direction in the film thickness of the reflecting layer, and the method can be implemented before or after the die bonding process. Compared with the conventional silk-screen printing method, the method is more flexible, which can not only avoid influence on the solder paste printing accuracy of the backlight panel, but also prevent the cured reflecting layer from warping, so as to ensure the preparation accuracy of the reflecting layer.

6 Claims, 14 Drawing Sheets

(51) Int. Cl.
| | | |
|---|---|---|
| *B41J 3/407* | (2006.01) | |
| *B41M 1/26* | (2006.01) | |
| *G02F 1/13357* | (2006.01) | |

(52) U.S. Cl.
CPC ......... *B41M 1/26* (2013.01); *G02F 1/133603* (2013.01); *G02F 1/133605* (2013.01)

(56) References Cited

U.S. PATENT DOCUMENTS

| | | | | |
|---|---|---|---|---|
| 2005/0122351 A1* | 6/2005 | Yamazaki | .............. | H10K 71/13 |
| | | | | 347/5 |
| 2007/0070099 A1 | 3/2007 | Beer et al. | | |
| 2011/0107963 A1* | 5/2011 | Park | .................... | H01L 21/6715 |
| | | | | 118/313 |
| 2015/0298153 A1* | 10/2015 | Baker | ................. | B41J 2/04593 |
| | | | | 118/712 |
| 2018/0321557 A1 | 11/2018 | Pelka | | |

FOREIGN PATENT DOCUMENTS

| | | | |
|---|---|---|---|
| CN | 113272145 | | 8/2021 |
| CN | 113985652 | | 1/2022 |
| CN | 114683729 | | 7/2022 |
| JP | 2009070756 | | 4/2009 |
| JP | 2014158011 A | * | 8/2014 |

* cited by examiner

Figures 12, 13:
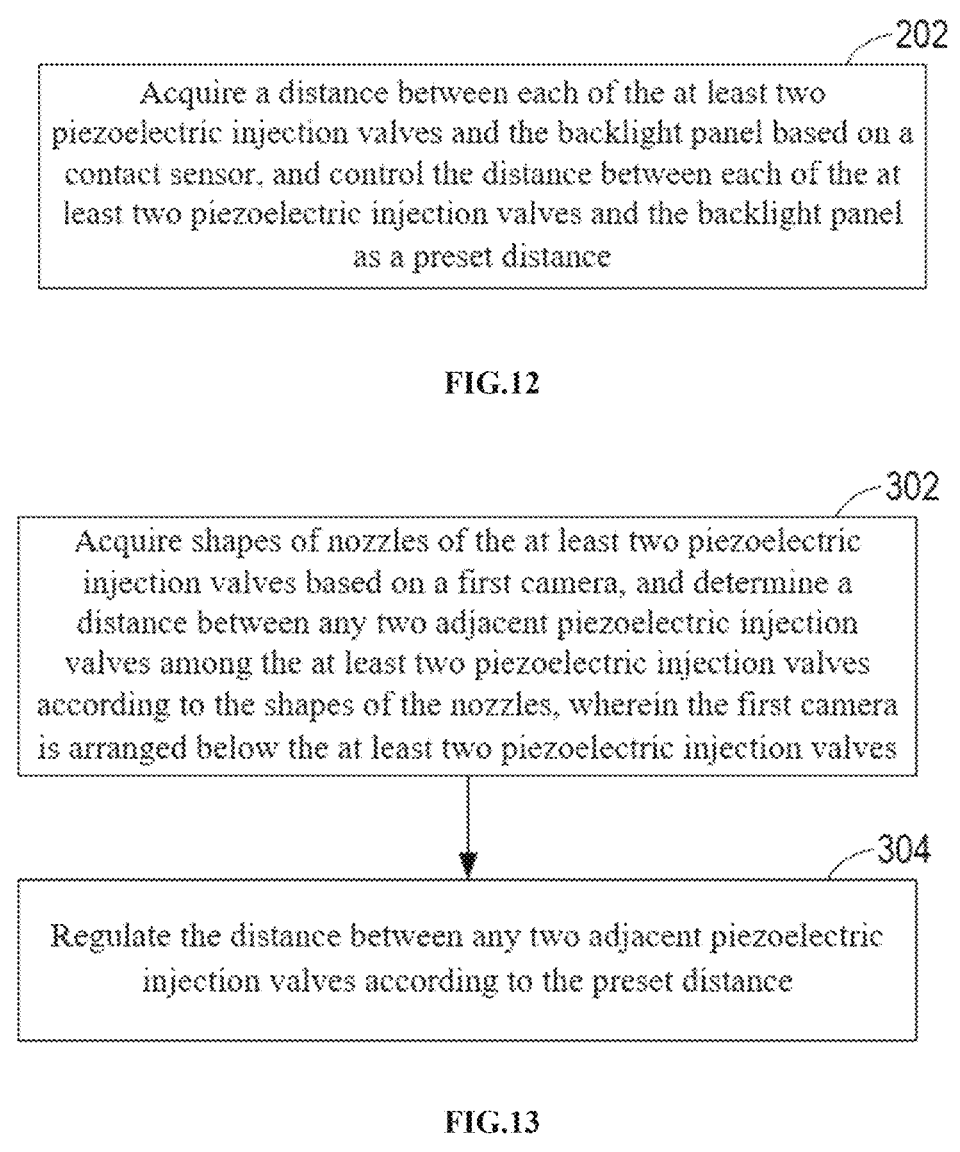

202

Acquire a distance between each of the at least two piezoelectric injection valves and the backlight panel based on a contact sensor, and control the distance between each of the at least two piezoelectric injection valves and the backlight panel as a preset distance

Acquire shapes of nozzles of the at least two piezoelectric injection valves based on a first camera, and determine a distance between any two adjacent piezoelectric injection valves among the at least two piezoelectric injection valves according to the shapes of the nozzles, wherein the first camera is arranged below the at least two piezoelectric injection valves

304

Regulate the distance between any two adjacent piezoelectric injection valves according to the preset distance

Figure 14:
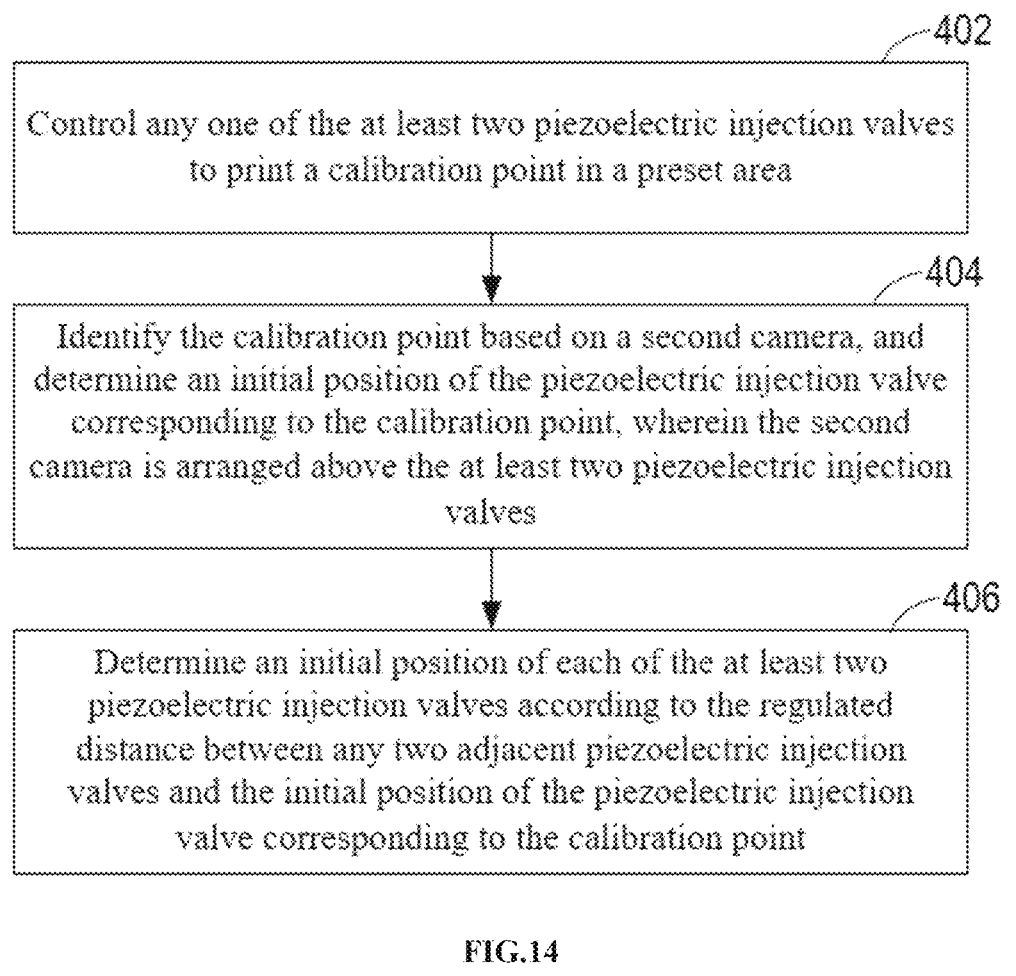

Control any one of the at least two piezoelectric injection valves to print a calibration point in a preset area

404

Identify the calibration point based on a second camera, and determine an initial position of the piezoelectric injection valve corresponding to the calibration point, wherein the second camera is arranged above the at least two piezoelectric injection valves

406

Determine an initial position of each of the at least two piezoelectric injection valves according to the regulated distance between any two adjacent piezoelectric injection valves and the initial position of the piezoelectric injection valve corresponding to the calibration point

Figure 15:
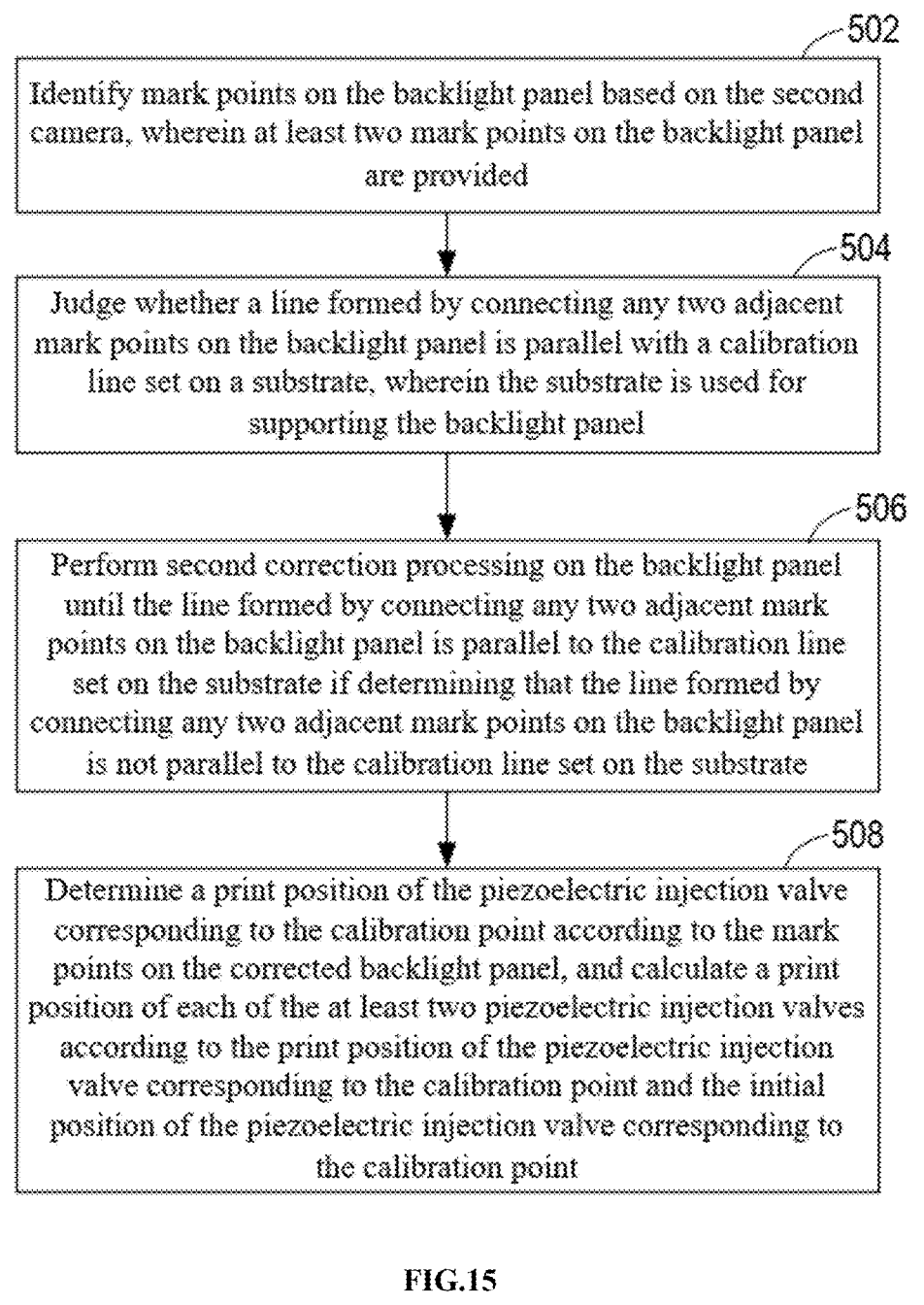

Identify mark points on the backlight panel based on the second camera, wherein at least two mark points on the backlight panel are provided

504

Judge whether a line formed by connecting any two adjacent mark points on the backlight panel is parallel with a calibration line set on a substrate, wherein the substrate is used for supporting the backlight panel

506

Perform second correction processing on the backlight panel until the line formed by connecting any two adjacent mark points on the backlight panel is parallel to the calibration line set on the substrate if determining that the line formed by connecting any two adjacent mark points on the backlight panel is not parallel to the calibration line set on the substrate

508

Determine a print position of the piezoelectric injection valve corresponding to the calibration point according to the mark points on the corrected backlight panel, and calculate a print position of each of the at least two piezoelectric injection valves according to the print position of the piezoelectric injection valve corresponding to the calibration point and the initial position of the piezoelectric injection valve corresponding to the calibration point

Figure 16:
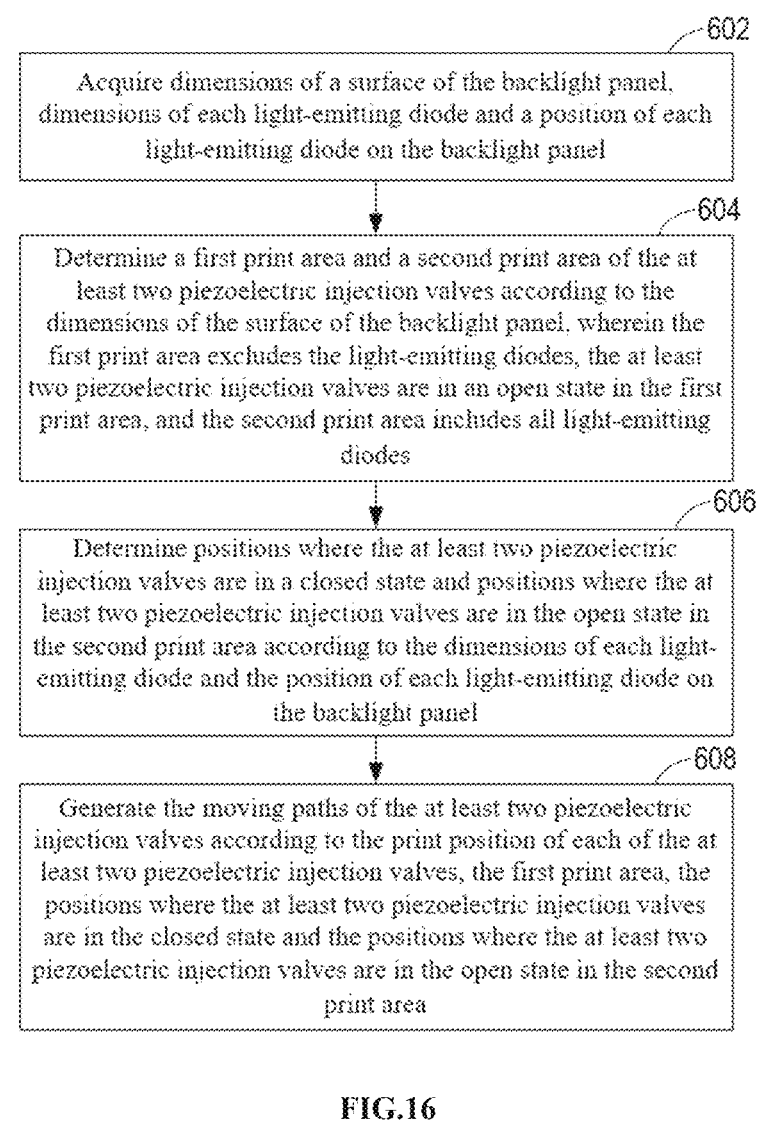

Acquire dimensions of a surface of the backlight panel, dimensions of each light-emitting diode and a position of each light-emitting diode on the backlight panel

604

Determine a first print area and a second print area of the at least two piezoelectric injection valves according to the dimensions of the surface of the backlight panel, wherein the first print area excludes the light-emitting diodes, the at least two piezoelectric injection valves are in an open state in the first print area, and the second print area includes all light-emitting diodes

606

Determine positions where the at least two piezoelectric injection valves are in a closed state and positions where the at least two piezoelectric injection valves are in the open state in the second print area according to the dimensions of each light-emitting diode and the position of each light-emitting diode on the backlight panel

608

Generate the moving paths of the at least two piezoelectric injection valves according to the print position of each of the at least two piezoelectric injection valves, the first print area, the positions where the at least two piezoelectric injection valves are in the closed state and the positions where the at least two piezoelectric injection valves are in the open state in the second print area

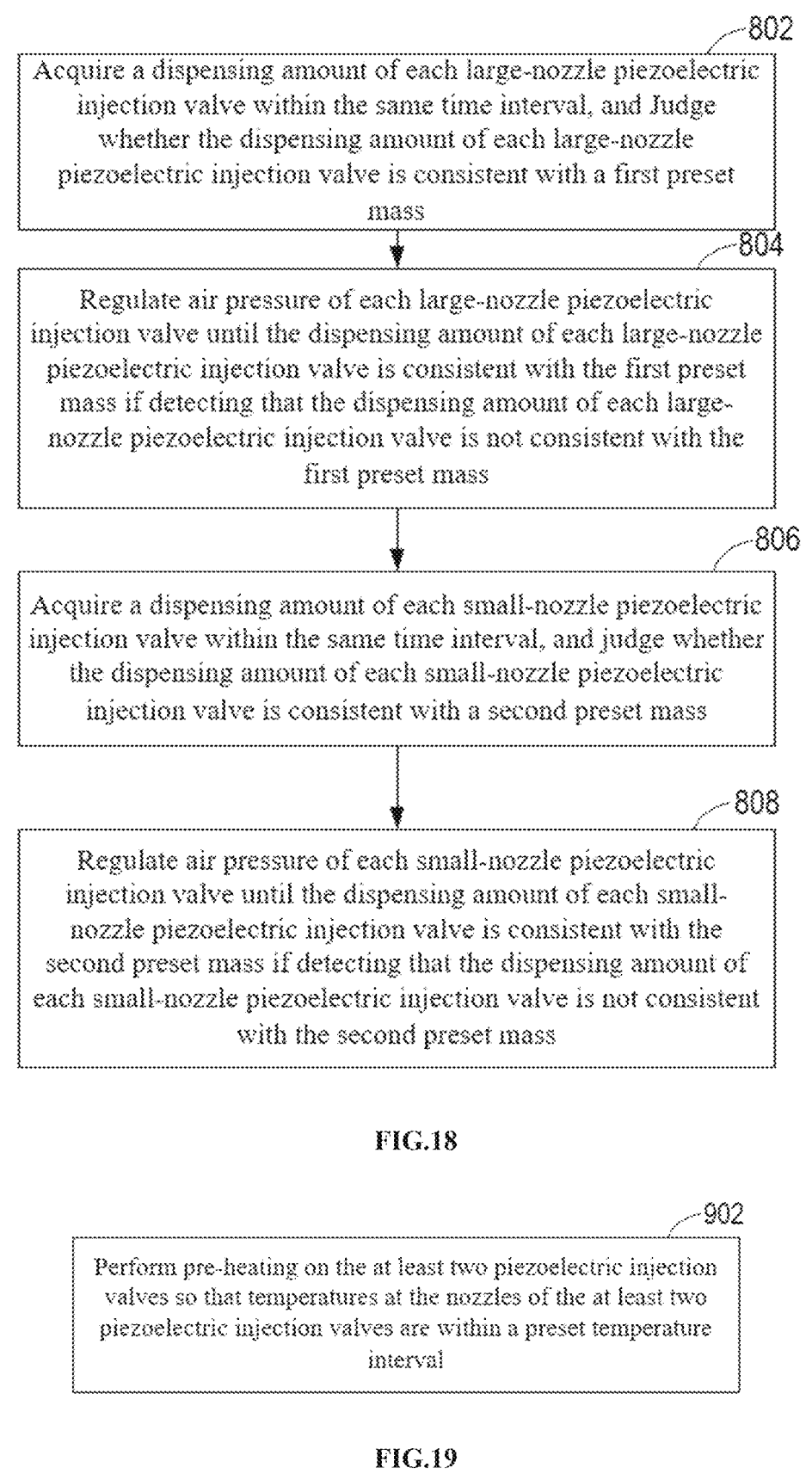

Acquire a dispensing amount of each large-nozzle piezoelectric injection valve within the same time interval, and Judge whether the dispensing amount of each large-nozzle piezoelectric injection valve is consistent with a first preset mass

804

Regulate air pressure of each large-nozzle piezoelectric injection valve until the dispensing amount of each large-nozzle piezoelectric injection valve is consistent with the first preset mass if detecting that the dispensing amount of each large-nozzle piezoelectric injection valve is not consistent with the first preset mass

806

Acquire a dispensing amount of each small-nozzle piezoelectric injection valve within the same time interval, and judge whether the dispensing amount of each small-nozzle piezoelectric injection valve is consistent with a second preset mass

808

Regulate air pressure of each small-nozzle piezoelectric injection valve until the dispensing amount of each small-nozzle piezoelectric injection valve is consistent with the second preset mass if detecting that the dispensing amount of each small-nozzle piezoelectric injection valve is not consistent with the second preset mass

Perform pre-heating on the at least two piezoelectric injection valves so that temperatures at the nozzles of the at least two piezoelectric injection valves are within a preset temperature interval

FIG.19

METHOD AND DEVICE FOR PRINTING REFLECTING LAYER OF BACKLIGHT PANEL

CROSS-REFERENCE TO RELATED APPLICATIONS

The application claims the benefit of China Patent Application No. 202210611440.5, filed on Jun. 1, 2022, which is incorporated herein by reference in its entirety.

TECHNICAL FIELD

The present disclosure belongs to the technical field of semiconductor processing, and particularly relates to a method and device for printing a reflecting layer of a backlight panel.

BACKGROUND

With the increasing popularization of semiconductor technologies, the processing accuracy of the semiconductor has become more mature. Generally, a backlight reflecting layer can be made on the circuit of the backlight panel in order to improve the reflection efficiency of a semiconductor backlight panel.

In the prior art, the backlight panel is usually coated with the reflecting layer by silk-screen printing, and a screen printing plate thereof is made according to concrete distribution patterns of the backlight panel. However, during actual printing, the silk-screen printing process should be completed before the die bonding process of the backlight panel, which easily affects the solder paste printing accuracy of the backlight panel. On the other hand, the integrated backlight panel subjected to silk-screen printing is prone to warping, which leads to a great difficulty in achieving the required accuracy for subsequent processes of the backlight panel.

The height of single silk-screen printing by ink cannot meet the high-reflectivity requirement of the reflecting layer of the backlight panel, and the number of printings needs to be increased to obtain the height of the reflecting layer meeting the requirements. In addition, ink materials used in silk-screen printing have overflow phenomena, which easily leads to poor accuracy and appearance of openings in the surrounding area of the backlight panel when the printing thickness is too large.

SUMMARY

Technical Problem

In conclusion, the existing printing process of a reflecting layer of a backlight panel is lower in accuracy, and easily affects the accuracy of subsequent processes. The resulting printing cost is too high, which affects the customer satisfaction with the printed reflecting layer.

Technical Solutions

In order to solve the above-mentioned problems that the printing process is lower in accuracy, and easily affects the accuracy of the subsequent processes, the resulting printing cost is too high and the like, the present disclosure provides a method and device for printing a reflecting layer of a backlight panel. The reflecting layer is printed by controlling piezoelectric injection valves to achieve a stepless change in the thickness of the reflecting layer, which can not only avoid influence on the solder paste printing accuracy of the backlight panel, but can also prevent the cured reflecting layer from warping, so as to ensure the preparation accuracy of the reflecting layer. A technical solution of the present disclosure is as follows:

In a first aspect, the present disclosure provides a method for printing a reflecting layer of a backlight panel, including:

performing first correction processing on at least two piezoelectric injection valves;

acquiring specification parameters of the backlight panel, and generating moving paths of the at least two piezoelectric injection valves according to the specification parameters of the backlight panel; and controlling the at least two corrected piezoelectric injection valves to print according to the moving paths.

In one or more embodiments of the first aspect, the process of performing first correction processing on the at least two piezoelectric injection valves includes:

acquiring a distance between each of the at least two piezoelectric injection valves and the backlight panel based on a contact sensor, and controlling the distance between each of the at least two piezoelectric injection valves and the backlight panel as a first preset distance.

In one or more embodiments of the first aspect, the process of performing first correction processing on the at least two piezoelectric injection valves further includes:

acquiring shapes of nozzles of the at least two piezoelectric injection valves based on a first camera, and determining a distance between any two adjacent piezoelectric injection valves among the at least two piezoelectric injection valves according to the shapes of the nozzles, wherein the first camera is arranged below the at least two piezoelectric injection valves; and regulating the distance between any two adjacent piezoelectric injection valves according to a second preset distance.

In one or more embodiments of the first aspect, the process of performing first correction processing on the at least two piezoelectric injection valves further includes:

controlling any one of the at least two piezoelectric injection valves to print a calibration point in a preset area;

identifying the calibration point based on a second camera, and determining an initial position of the piezoelectric injection valve corresponding to the calibration point, wherein the second camera is arranged above the at least two piezoelectric injection valves; and determining an initial position of each of the at least two piezoelectric injection valves according to the regulated distance between any two adjacent piezoelectric injection valves and the initial position of the piezoelectric injection valve corresponding to the calibration point.

In one or more embodiments of the first aspect, the at least two piezoelectric injection valves include at least two large-nozzle piezoelectric injection valves and at least two small-nozzle piezoelectric injection valves;

The process of performing first correction processing on the at least two piezoelectric injection valves further includes:

acquiring an adhesive quality of each large-nozzle piezoelectric injection valve within the same time interval, and judging whether the adhesive quality of each large-nozzle piezoelectric injection valve is consistent with a first preset mass;

regulating air pressure of each large-nozzle piezoelectric injection valve until the adhesive quality of each large-nozzle piezoelectric injection valve is consistent with the first preset mass if detecting that the adhesive quality of each large-nozzle piezoelectric injection valve is not consistent with the first preset mass;

acquiring an adhesive quality of each small-nozzle piezoelectric injection valve within the same time interval, and judging whether the adhesive quality of each small-nozzle piezoelectric injection valve is consistent with a second preset mass; and regulating air pressure of each small-nozzle piezoelectric injection valve until the adhesive quality of each small-nozzle piezoelectric injection valve is consistent with the second preset mass if detecting that the adhesive quality of each small-nozzle piezoelectric injection valve is not consistent with the second preset mass.

In one or more embodiments of the first aspect, the process of performing first correction processing on the at least two piezoelectric injection valves further includes:

performing pre-heating on the at least two piezoelectric injection valves so that temperatures at the nozzles of the at least two piezoelectric injection valves are within a preset temperature interval.

In one or more embodiments of the first aspect, before the process of controlling the at least two corrected piezoelectric injection valves to print according to the moving paths, the method further includes:

fusing a diluent with a first preset concentration and a leveling agent with a second preset concentration, to obtain printing materials of the at least two corrected piezoelectric injection valves;

the process of controlling the at least two corrected piezoelectric injection valves to print according to the moving paths includes:

filling the at least two corrected piezoelectric injection valves with the printing materials, and controlling the at least two corrected piezoelectric injection valves to print according to the moving paths.

In one or more embodiments of the first aspect, before the process of controlling the at least two corrected piezoelectric injection valves to print according to the moving paths, the method further includes:

cleaning a surface of the backlight panel.

In one or more embodiments of the first aspect, after the process of performing first correction processing on the at least two piezoelectric injection valves, and before the process of acquiring the specification parameters of the backlight panel and generating the moving paths of the at least two piezoelectric injection valves according to the specification parameters of the backlight panel, the method further includes:

identifying mark points on the backlight panel based on the second camera, wherein at least two mark points on the backlight panel are provided;

judging whether a line formed by connecting any two adjacent mark points on the backlight panel is parallel to a calibration line set on a substrate, wherein the substrate is used for supporting the backlight panel;

performing second correction processing on the backlight panel until the line formed by connecting any two adjacent mark points on the backlight panel is parallel to the calibration line set on the substrate if determining that the line formed by connecting any two adjacent mark points on the backlight panel is not parallel to the calibration line set on the substrate; and determining a print position of the piezoelectric injection valve corresponding to the calibration point according to the mark points of the corrected backlight panel, and calculating a print position of each of the at least two piezoelectric injection valves according to the print position of the piezoelectric injection valve corresponding to the calibration point and the initial position of the piezoelectric injection valve corresponding to the calibration point.

In one or more embodiments of the first aspect, the backlight panel includes at least two light-emitting diodes;

the process of acquiring the specification parameters of the backlight panel and generating the moving paths of the at least two piezoelectric injection valves according to the specification parameters of the backlight panel includes:

acquiring dimensions of the surface of the backlight panel, dimensions of each light-emitting diode and a position of each light-emitting diode on the backlight panel;

determining a first print area and a second print area of the at least two piezoelectric injection valves according to the dimensions of the surface of the backlight panel, wherein the first print area excludes the light-emitting diodes, the at least two piezoelectric injection valves are in an open state in the first print area, and the second print area includes all light-emitting diodes;

determining positions where the at least two piezoelectric injection valves are in a closed state and positions where the at least two piezoelectric injection valves are in an open state in the second print area according to the dimensions of each light-emitting diode and the position of each light-emitting diode on the backlight panel; and generating the moving paths of the at least two piezoelectric injection valves according to the print position of each of the at least two piezoelectric injection valves, the first print area, the positions where the at least two piezoelectric injection valves are in the closed state and the positions where the at least two piezoelectric injection valves are in the open state in the second print area.

In one or more embodiments of the first aspect, before the process of controlling the at least two corrected piezoelectric injection valves to print according to the moving paths, the method further includes:

determining print heights of the at least two piezoelectric injection valves according to the dimensions of the surface of the backlight panel, and regulating a distance between each of the at least two piezoelectric injection valves and the substrate according to the print heights of the at least two piezoelectric injection valves.

In one or more embodiments of the first aspect, after the process of controlling the at least two corrected piezoelectric injection valves to print according to the moving paths, the method further includes:

performing curing on the printed reflecting layer of the backlight panel.

In one or more embodiments of the first aspect, after the process of controlling the at least two corrected piezoelectric injection valves to print according to the moving paths, the method further includes:

moving the at least two piezoelectric injection valves to a cleaning area, and cleaning each piezoelectric injection valve.

In one or more embodiments of the first aspect, the method is implemented before the die bonding process of the backlight panel; or

the method is implemented after the die bonding process of the backlight panel.

In a second aspect, the present disclosure provides a device for printing a reflecting layer of a backlight panel, including:

a first processing module, configured to perform first correction processing on at least two piezoelectric injection valves;

a generation module, configured to acquire specification parameters of the backlight panel, and generate moving paths of the at least two piezoelectric injection valves according to the specification parameters of the backlight panel; and a print module, configured to control the at least two corrected piezoelectric injection valves to print according to the moving paths.

In one or more embodiments of the second aspect, the first processing module includes:

a first control unit, configured to acquire a distance between each of the at least two piezoelectric injection valves and the backlight panel based on a contact sensor, and control the distance between each of the at least two piezoelectric injection valves and the backlight panel as a first preset distance.

In one or more embodiments of the second aspect, the first processing module further includes:

a first acquisition unit, configured to acquire shapes of nozzles of the at least two piezoelectric injection valves based on a first camera, and determine a distance between any two adjacent piezoelectric injection valves among the at least two piezoelectric injection valves according to the shapes of the nozzles, wherein the first camera is arranged below the at least two piezoelectric injection valves; and a second control unit, configured to regulate the distance between any two adjacent piezoelectric injection valves according to a second preset distance.

In one or more embodiments of the second aspect, the first processing module further includes:

a print unit, configured to control any one of the at least two piezoelectric injection valves to print a calibration point in a preset area;

an identification unit, configured to identify the calibration point based on a second camera, and determine an initial position of the piezoelectric injection valve corresponding to the calibration point, wherein the second camera is arranged above the at least two piezoelectric injection valves; and a third control unit, configured to determine an initial position of each of the at least two piezoelectric injection valves according to the regulated distance between any two adjacent piezoelectric injection valves and the initial position of the piezoelectric injection valve corresponding to the calibration point.

In one or more embodiments of the second aspect, the at least two piezoelectric injection valves include at least two large-nozzle piezoelectric injection valves and at least two small-nozzle piezoelectric injection valves;

the first processing module further includes:

a second acquisition unit, configured to acquire an adhesive quality of each large-nozzle piezoelectric injection valve within the same time interval, and judge whether the adhesive quality of each large-nozzle piezoelectric injection valve is consistent with a first preset mass;

a fourth control unit, configured to regulate air pressure of each large-nozzle piezoelectric injection valve until the adhesive quality of each large-nozzle piezoelectric injection valve is consistent with the first preset mass if detecting that the adhesive quality of each large-nozzle piezoelectric injection valve is not consistent with the first preset mass;

a third acquisition unit, configured to acquire an adhesive quality of each small-nozzle piezoelectric injection valve within the same time interval, and judge whether the adhesive quality of each small-nozzle piezoelectric injection valve is consistent with a second preset mass;

a fifth control unit, configured to regulate air pressure of each small-nozzle piezoelectric injection valve until the adhesive quality of each small-nozzle piezoelectric injection valve is consistent with the second preset mass if detecting that the adhesive quality of each small-nozzle piezoelectric injection valve is not consistent with the second preset mass;

In one or more embodiments of the second aspect, the first processing module further includes:

a heating unit, configured to perform pre-heating on the at least two piezoelectric injection valves so that temperatures at nozzles of the at least two piezoelectric injection valves are within a preset temperature interval.

In one or more embodiments of the second aspect, the device further includes:

a fusion module, configured to fuse a diluent with a first preset concentration and a leveling agent with a second preset concentration, to obtain printing materials of the at least two corrected piezoelectric injection valves before the at least two corrected piezoelectric injection valves are controlled to print according to the moving paths;

the print module is specifically configured to fill the at least two corrected piezoelectric injection valves with the printing materials, and control the at least two corrected piezoelectric injection valves to print according to the moving paths.

In one or more embodiments of the second aspect, the device further includes:

a first cleaning module, configured to clean a surface of the backlight panel before the at least two corrected piezoelectric injection valves are controlled to print according to the moving paths.

In one or more embodiments of the second aspect, the device further includes:

an identification module, configured to identify mark points on the backlight panel based on the second camera after first correction processing is performed on the at least two piezoelectric injection valves, and before the specification parameters of the backlight panel are acquired, and the moving paths of the at least two piezoelectric injection valves are generated according to the specification parameters of the backlight panel, wherein at least two mark points on the backlight panel are provided;

a judgment module, configured to judge whether a line formed by connecting any two adjacent mark points on the backlight panel is parallel to a calibration line set on a substrate, wherein the substrate is used for supporting the backlight panel;

a second processing module, configured to perform second correction processing on the backlight panel until the line formed by connecting any two adjacent mark points on the backlight panel is parallel to the calibration line set on the substrate if determining that the line formed by connecting any two adjacent mark points on the backlight panel is not parallel to the calibration line set on the substrate; and a calculation module, configured to determine a print position of the piezoelectric injection valve corresponding to the calibration point according to the mark points of the corrected backlight panel, and calculate a print position of each of the at least two piezoelectric injection valves according to the print position of the piezoelectric injection valve corresponding to the calibration point and the initial position of the piezoelectric injection valve corresponding to the calibration point.

In one or more embodiments of the second aspect, the backlight panel includes at least two light-emitting diodes; the generation module includes:

a fourth acquisition unit, configured to acquire dimensions of the surface of the backlight panel, dimensions of each light-emitting diode and the position of each light-emitting diode on the backlight panel;

a dividing unit, configured to determine a first print area and a second print area of the at least two piezoelectric injection valves according to the dimensions of the surface of the backlight panel, wherein the first print area excludes the light-emitting diodes, the at least two piezoelectric injection valves are in an open state in the first print area, and the second print area includes all light-emitting diodes;

a processing unit, configured to determine positions where the at least two piezoelectric injection valves are in a closed state and positions where the at least two piezoelectric injection valves are in an open state in the second print area according to the dimensions of each light-emitting diode and the position of each light-emitting diode on the backlight panel; and a generation unit, configured to generate the moving paths of the at least two piezoelectric injection valves according to the print position of each of the at least two piezoelectric injection valves, the first print area, the positions where the at least two piezoelectric injection valves are in the closed state and the positions where the at least two piezoelectric injection valves are in the open state in the second print area.

In one or more embodiments of the second aspect, the device further includes:

a first regulation module, configured to determine print heights of the at least two piezoelectric injection valves according to the dimensions of the surface of the backlight panel, and regulate a distance between each of the at least two piezoelectric injection valves and the substrate according to the print heights of the at least two piezoelectric injection valves before the at least two corrected piezoelectric injection valves are controlled to print according to the moving paths.

In one or more embodiments of the second aspect, the device further includes:

a curing module, configured to perform curing on the printed reflecting layer of the backlight panel after the at least two corrected piezoelectric injection valves are controlled to print according to the moving paths.

In one or more embodiments of the second aspect, the device further includes:

a second cleaning module, configured to move the at least two piezoelectric injection valves to a cleaning area, and clean each piezoelectric injection valve after the at least two corrected piezoelectric injection valves are controlled to print according to the moving paths.

In one or more embodiments of the second aspect, the method is implemented before the die bonding process of the backlight panel; or the method is implemented after the die bonding process of the backlight panel.

In a third aspect, the present disclosure further provides a device for printing a reflecting layer of a backlight panel, including a processor and a memory; wherein:

the processor is connected with the memory;

the memory is configured to store executable program codes; and the processor is configured to run programs corresponding to the executable program codes by reading the executable program codes stored in the memory, to implement the method for printing the reflecting layer of the backlight panel provided by the first aspect or any implementation mode of the first aspect in the embodiments of the present disclosure.

In a fourth aspect, the present disclosure provides a computer storage medium on which computer programs are stored. The computer programs include program instructions. When the program instructions are executed by the processor, the method for printing the reflecting layer of the backlight panel provided by the first aspect or any implementation mode of the first aspect in the embodiments of the present disclosure may be implemented.

Beneficial Effects

First correction processing can be performed on the at least two piezoelectric injection valves firstly, and then the specification parameters of the backlight panel are acquired. The moving paths of the at least two piezoelectric injection valves are generated according to the specification parameters of the backlight panel, and the at least two corrected piezoelectric injection valves are controlled to print according to the moving paths. The reflecting layer is printed by controlling the piezoelectric injection valves to achieve stepless change in the film thickness of the reflecting layer, and the method can be implemented before or after the die bonding process. Compared with conventional silk-screen printing, the method is more flexible, which cannot only avoid influence on the solder paste printing accuracy of the backlight panel, but also prevent the cured reflecting layer from warping, so as to ensure the preparation accuracy of the reflecting layer.

BRIEF DESCRIPTION OF THE DRAWINGS

In order to more clearly illustrate the technical solutions of the embodiments of the present disclosure, the drawings needed in the embodiments will be simply introduced below. Obviously, the drawings in the description below are only some embodiments of the present disclosure, and those ordinarily skilled in the art can obtain other drawings according to these drawings without involving inventive efforts.

FIG. 12 is a flow diagram of a process of performing first correction processing on at least two piezoelectric injection valves by one embodiment of the present disclosure;

FIG. 13 is a flow diagram of a process of performing first correction processing on at least two piezoelectric injection valves by another embodiment of the present disclosure;

FIG. 14 is a flow diagram of a process of performing first correction processing on at least two piezoelectric injection valves by another embodiment of the present disclosure;

FIG. 15 is a flow diagram of a process that occurs after the first correction processing is performed and before moving paths of the at least two piezoelectric injection valves are generated by an embodiment of the present disclosure;

FIG. 16 is a flow diagram of a process of generating the moving paths of the at least two piezoelectric injection valves by an embodiment of the present disclosure;

FIG. 18 is a flow diagram of a process of performing first correction processing on at least two piezoelectric injection valves by another embodiment of the present disclosure; and FIG. 19 is a flow diagram of a process of performing first correction processing on at least two piezoelectric injection valves by another embodiment of the present disclosure.

DETAILED DESCRIPTION OF THE EMBODIMENTS

Detailed Description of the Present Disclosure

The technical solutions in the embodiments of the present disclosure will be clearly and completely described below with reference to drawings in embodiments of the present disclosure.

In the following description, the terms "first" and "second" are only for description and shall not be understood as indication or implication of relative importance. A plurality of embodiments of the present disclosure are described below. Different embodiments can be replaced or combined with each other, and therefore the present disclosure can also be considered to include all possible combinations of the same and/or different recorded embodiments. Thus, if one embodiment includes features A, B and C and another embodiment includes features B and D, the present disclosure should also be considered to include the embodiments containing one or more of all other possible combinations of A, B, C and D, although the embodiments may not be definitely recorded in the following content in writing.

The following description provides examples, which are not construed as a limitation to the scope, applicability or examples described in claims. Changes in functions and arrangement of described elements can be made without departing from the scope of the content in the present disclosure. Various processes or assemblies can be properly omitted, replaced or added in each example. For example, the described method can be implemented in an order different than the one described, and various steps can be added, omitted or combined. In addition, features described in some examples can be combined into other examples.

Figure 1:
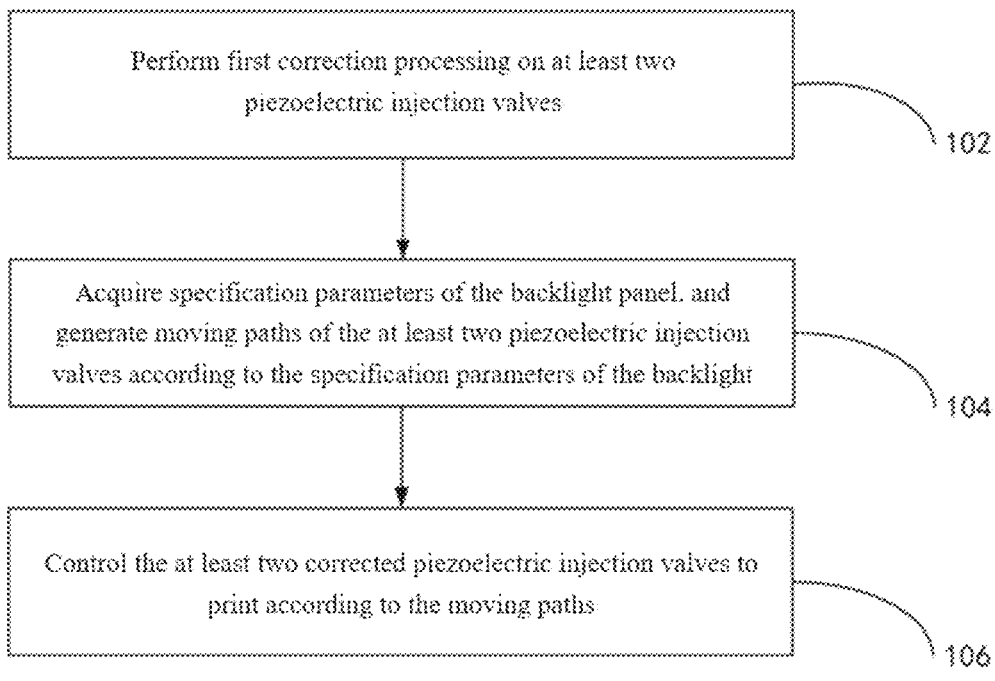
FIG. 1 is a flow diagram of a method for printing a reflecting layer of a backlight panel provided by an embodiment of the present disclosure.

Referring to FIG. 1, FIG. 1 shows a flow diagram of a method for printing a reflecting layer of a backlight panel provided by an embodiment of the present disclosure.

As shown in FIG. 1, the method for printing the reflecting layer of the backlight panel may at least include the following steps:

step 102, first correction processing is performed on at least two piezoelectric injection valves.

Specifically, the number and corresponding arrangement positions of the at least two piezoelectric injection valves for printing the reflecting layer may be determined firstly, and first correction processing is performed on the at least two piezoelectric injection valves during printing of the reflecting layer of the backlight panel after the die bonding process of the backlight panel is completed. Wherein, types of the at least two piezoelectric injection valves may include, but are not limited to, large-nozzle piezoelectric injection valves and small-nozzle piezoelectric injection valves, and the area of the reflecting layer printed by the large-nozzle piezoelectric injection valves is larger than that of the reflecting layer printed by the small-nozzle piezoelectric injection valves. It is understandable that the reflecting layer of the backlight panel may be printed by the at least two large-nozzle piezoelectric injection valves and the at least two small-nozzle piezoelectric injection valves. The at least two large-nozzle piezoelectric injection valves may be arranged side by side, and a distance between every two adjacent large-nozzle piezoelectric injection valves may be regulated at will. The at least two small-nozzle piezoelectric injection valves may also be arranged side by side, and a distance between every two adjacent small-nozzle piezoelectric injection valves may also be regulated at will. The distance between each large-nozzle piezoelectric injection valve and the backlight panel is different from the distance between each small-nozzle piezoelectric injection valve and the backlight panel. Certainly, the at least two piezoelectric injection valves in this embodiment may also be of the same type; for example, they may be, but not limited to, the at least two large-nozzle piezoelectric injection valves or the at least two small-nozzle piezoelectric injection valves.

Figure 17A:
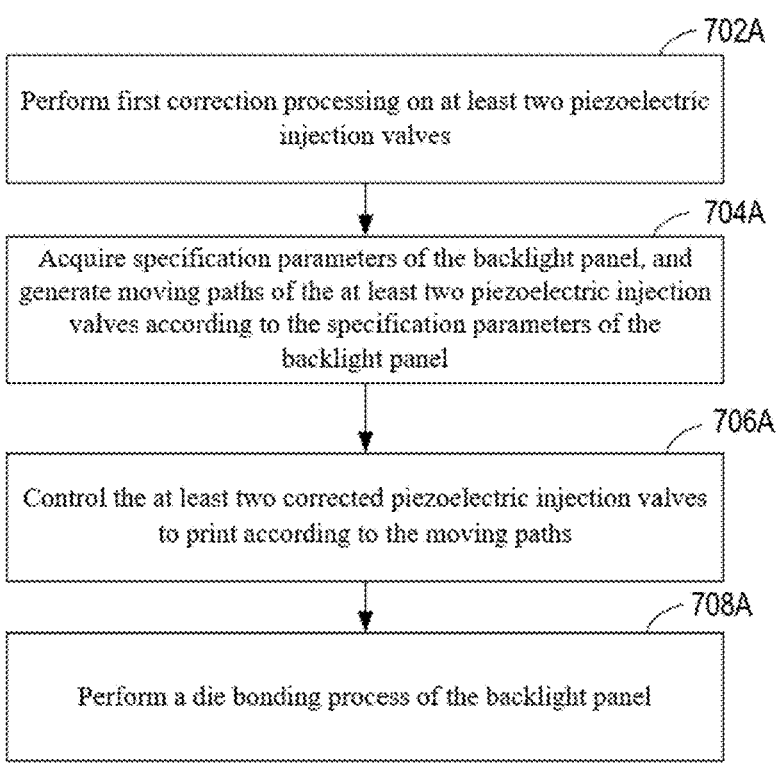
FIG. 17*a* is a flow diagram of a process of printing a reflecting layer of a backlight panel and a die bonding process of the backlight panel provided by one embodiment of the present disclosure.
Figure 17B:
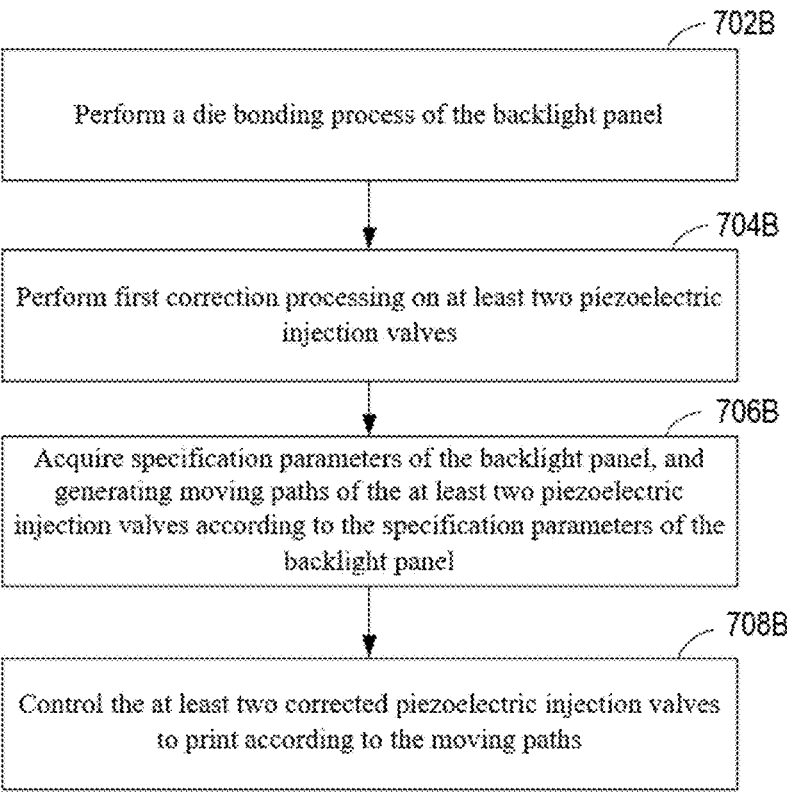
FIG. 17*b* is a flow diagram of a process of printing a reflecting layer of a backlight panel and a die bonding process of the backlight panel provided by another embodiment of the present disclosure.

It should be noted that the method for printing the reflecting layer of the backlight panel in the embodiments of the present disclosure may be implemented, but not limited to, before the die bonding process of the backlight panel (referring to FIG. 17*a*), or after the die bonding process of the backlight panel (referring to FIG. 17*b*). Compared with conventional silk-screen printing, the method is more flexible, which can prevent the cured reflecting layer from warping. It is understandable that the die bonding process here is a conventional technical means in the art, and will not be described in detail.

Figure 2:
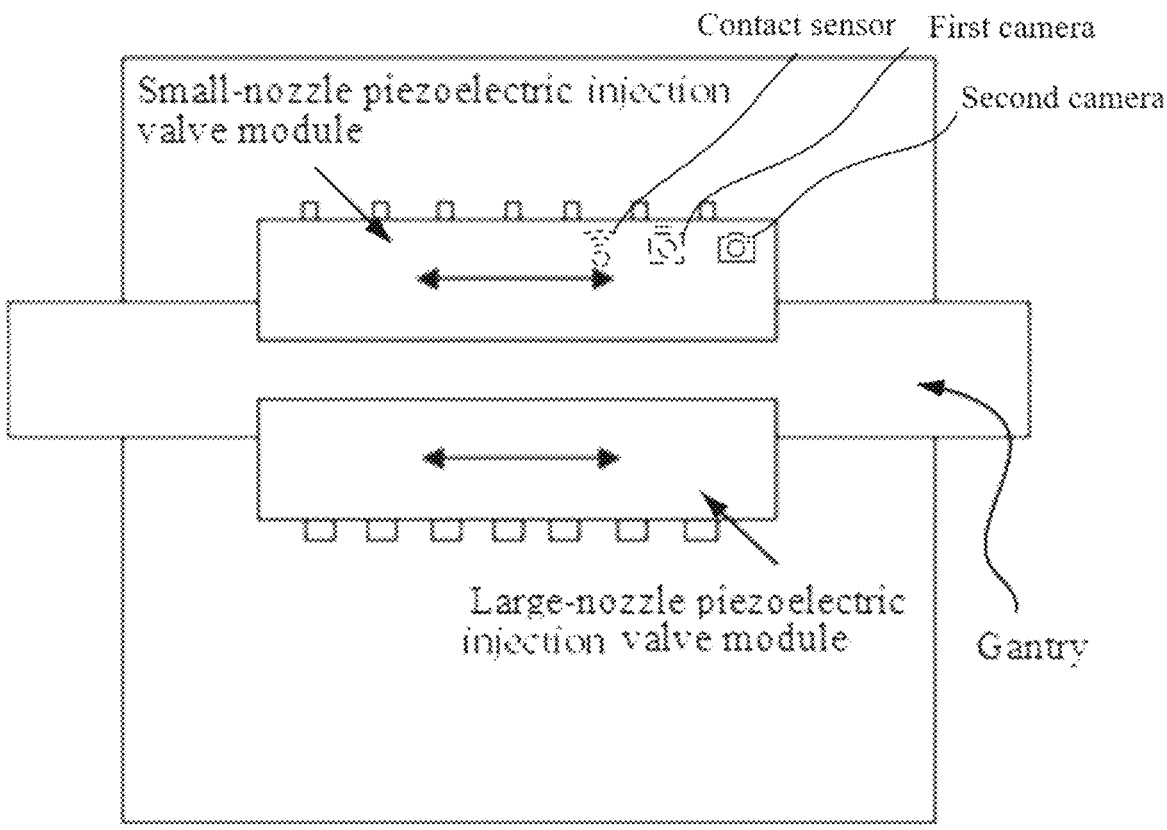
FIG. 2 is a top view of a structure of a motor module provided by an embodiment of the present disclosure.

The top view of a structure of a motor module provided by the embodiments of the present disclosure shown in FIG. 2 may be referred here. As shown in FIG. 2, the motor module may be arranged above the backlight panel, and may include, but is not limited to, a gantry, and a small-nozzle piezoelectric injection valve module and a large-nozzle piezoelectric injection valve module which are arranged on two sides of the gantry respectively. Wherein, the small-nozzle piezoelectric injection valve module may be controlled by a motor to do reciprocating motion in a horizontal direction on one side of the gantry. The small-nozzle piezoelectric injection valve module may include, but is not limited to, seven small-nozzle piezoelectric injection valves, and a distance between every two adjacent small-nozzle piezoelectric injection valves is same. The large-nozzle piezoelectric injection valve module may be controlled by a motor to do reciprocating motion in a horizontal direction on the other side of the gantry. The large-nozzle piezoelectric injection valve module may include, but not limited to, seven large-nozzle piezoelectric injection valves, and a distance between every two adjacent large-nozzle piezoelectric injection valves is same. It is understandable that each small-nozzle piezoelectric injection valve and each large-nozzle piezoelectric injection valve may be controlled separately, thereby facilitating regulation of positions thereof according to dimensions of the backlight panel. It should be noted that the small-nozzle piezoelectric injection valve module and the large-nozzle piezoelectric injection valve module on the motor module as shown in FIG. 2 may also be staggered up and down, not only can the distance between the small-nozzle piezoelectric injection valve module and the backlight panel and the distance between the large-nozzle piezoelectric injection valve module and the backlight panel be controlled, but also more small-nozzle piezoelectric injection valves may be set in the small-nozzle piezoelectric injection valve module conveniently and more large-nozzle piezoelectric injection valves may be set in the large-nozzle piezoelectric injection valve module conveniently.

Furthermore, after the number and corresponding arrangement positions of the at least two piezoelectric injection valves are determined, the distance between each of the at least two piezoelectric injection valves and the backlight panel may be acquired based on a contact sensor, and the distance between each of the at least two piezoelectric injection valves and the backlight panel is controlled as a first preset distance (referring to FIG. 12 in step 202).

Specifically, a nozzle of each of the at least two piezoelectric injection valves may be controlled to move to a position directly above the contact sensor firstly, and then the nozzle of each piezoelectric injection valve is controlled to come into contact with the contact sensor, till the contact sensor acquires corresponding electric signals by contact. It is understandable that the contact sensor may be arranged at, but not limited to, the height where the distance between the contact sensor and the backlight panel is a specified distance, and the corresponding height may be automatically regulated with change in the specified distance. It should be noted that the corresponding electric signals may be controlled to keep consistent after the nozzle of each of the at least two piezoelectric injection valves is in contact with the contact sensor, so that the distance between each of the at least two piezoelectric injection valves and the backlight panel is kept the same, so as to ensure the printing accuracy of the reflecting layer. Certainly, if the at least two piezoelectric injection valves include different types of piezoelectric injection valves, the distance between each type of piezoelectric injection valves and the backlight panel may be controlled to remain the same.

Step 104. specification parameters of the backlight panel are acquired, and moving paths of the at least two piezoelectric injection valves are generated according to the specification parameters of the backlight panel.

Specifically, after the first correction processing is performed on the at least two piezoelectric injection valves, dimensions of the surface of the backlight panel, dimensions of each light-emitting diode and the position of each light-emitting diode on the backlight panel may be acquired. Wherein, the backlight panel may include at least two light-emitting diodes, and the at least two light-emitting diodes are distributed symmetrically. It is understandable that the dimensions of the surface of the backlight panel may include a length and a width of the backlight panel, and the dimensions of each light-emitting diode may include a length and a width of the light-emitting diode. The position of each light-emitting diode on the backlight panel may be, but is not limited to, coordinates, corresponding to four vertexes of each light-emitting diode respectively, in a rectangular plane coordinate system built with a certain vertex of the backlight panel as an origin of coordinates and two adjacent edges of the backlight panel as an x-axis and a y-axis. The distance between any two adjacent light-emitting diodes may also be determined.

Certainly, the at least two light-emitting diodes in the embodiments of the present disclosure may also be distributed asymmetrically on the backlight panel, but are not limited thereto.

Furthermore, a first print area and a second print area of the at least two piezoelectric injection valves may be determined according to the dimensions of the surface of the backlight panel. Wherein, the first print area may be, but is not limited to, an area excluding the light-emitting diodes. In the first print area, the at least two piezoelectric injection valves need to be continuously in an open state, that is, the at least two piezoelectric injection valves are configured to continuously print the reflecting layer in the first print area. The second print area may be, but is not limited to, an area including all light-emitting diodes. In the second print area, the at least two piezoelectric injection valves need to be in a closed state when passing directly above each light-emitting diode, and need to be in an open state when leaving directly above each light-emitting diode, to avoid the situation that the reflecting layer is printed on the surface of each light-emitting diode and consequently the light-emitting effect of the backlight panel is affected. It is understandable that, in order to better distinguish the first print area from the second print area, the second print area may include all areas covering all light-emitting diodes and an area between any two adjacent light-emitting diodes, and the first print area may include all areas of a surface area of the backlight panel except for the second print area.

Furthermore, the positions where the at least two piezoelectric injection valves are in the closed state and the positions where the at least two piezoelectric injection valves are in the open state in the second print area are determined according to the dimensions of each light-emitting diode and the position of each light-emitting diode on the backlight panel.

13

14

Figure 3:
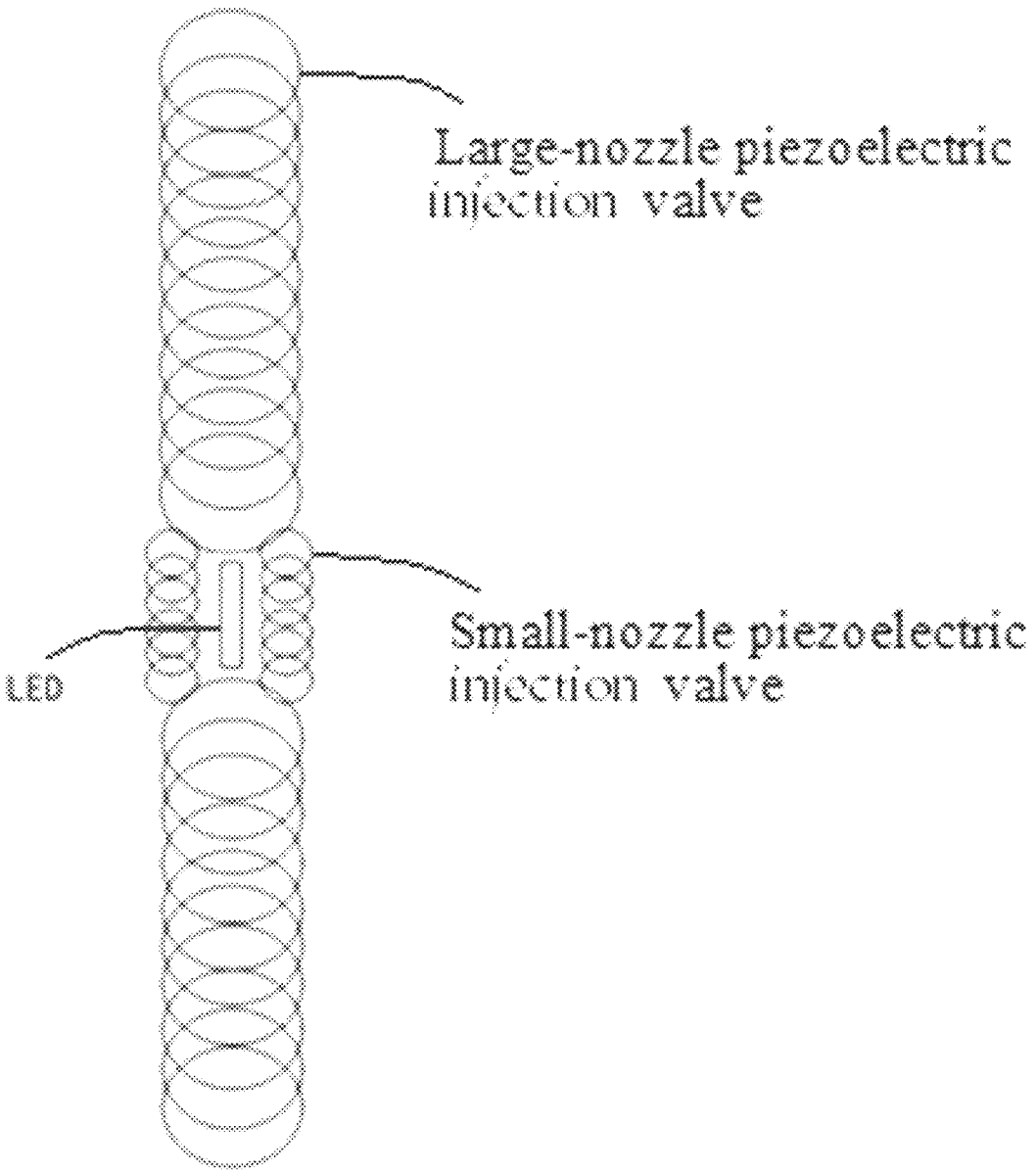
FIG. 3 is a schematic diagram showing a printing effect of one type of at least two piezoelectric injection valves provided by an embodiment of the present disclosure.

The schematic diagram showing the printing effect of one type of at least two piezoelectric injection valves provided by the embodiments of the present disclosure as shown in FIG. 3 may be referred here. As shown in FIG. 3, taking the type of the at least two piezoelectric injection valves which may include large-nozzle piezoelectric injection valves and small-nozzle piezoelectric injection valves as an example, when printing is conducted in the second print area, the large-nozzle piezoelectric injection valves may be controlled in the open state and the small-nozzle piezoelectric injection valves are controlled in the closed state firstly, and the piezoelectric injection valves are controlled to move over the upper edge of the backlight panel along the plane Y-axis in a reverse direction. When the piezoelectric injection valves move to the upper edges of the light-emitting diodes, the large-nozzle piezoelectric injection valves may be controlled in the closed state and the small-nozzle piezoelectric injection valves are controlled in the open state, and the piezoelectric injection valves are controlled to continue to move along the plane Y-axis in the reverse direction. When the piezoelectric injection valves continue to move to the lower edges of the light-emitting diodes, the large-nozzle piezoelectric injection valves may be controlled in the open state and the small-nozzle piezoelectric injection valves are in the closed state, the piezoelectric injection valves are controlled to continue to move along the plane Y-axis in the reverse direction to the lower edge of the backlight panel, and both the large-nozzle piezoelectric injection valves and the small-nozzle piezoelectric injection valves are controlled in the closed state.

It should be noted that, after the positions where the at least two piezoelectric injection valves are in the closed state and the positions where the at least two piezoelectric injection valves are in the open state in the second print area are determined in the embodiments of the present disclosure, information corresponding to the positions where the at least two piezoelectric injection valves are in the closed state and information corresponding to the positions where the at least two piezoelectric injection valves are in the open state in the second print area may be input in an encoder in advance, thereby facilitating accurate control over the working state of the at least two piezoelectric injection valves according to the positions of the at least two piezoelectric injection valves in the process of printing the reflecting layer, and the time delay is reduced.

It is understandable that in FIG. 3, the shape of dots ejected by the large-nozzle piezoelectric injection valves may be a large-diameter circle (which may be changed to an oval due to slight deformation in the printing process), and the shape of dots ejected by the small-nozzle piezoelectric injection valves may be a small-diameter circle (which may be changed to an oval due to slight deformation in the printing process), and the present disclosure is not limited thereto.

Furthermore, moving paths of the at least two piezoelectric injection valves may be generated according to the first print area of the at least two piezoelectric injection valves, and the positions where the at least two piezoelectric injection valves are in the closed state and the positions where the at least two piezoelectric injection valves are in the open state in the second print area. It is understandable that if the type of the at least two piezoelectric injection valves includes the large-nozzle piezoelectric injection valves and the small-nozzle piezoelectric injection valves, when the reflecting layer is printed in the first print area, the operation may focus primarily on, but not confined to, controlling the large-nozzle piezoelectric injection valves in the normally open state (controlling the small-nozzle piezoelectric injection valves in the normally closed state), or controlling the small-nozzle piezoelectric injection valves in the normally open state (controlling the large-nozzle piezoelectric injection valves in the normally closed state), or controlling both the large-nozzle piezoelectric injection valves and the small-nozzle piezoelectric injection valves in the normally open state.

Step 106, the at least two corrected piezoelectric injection valves are controlled to print according to the moving paths.

Figure 4:
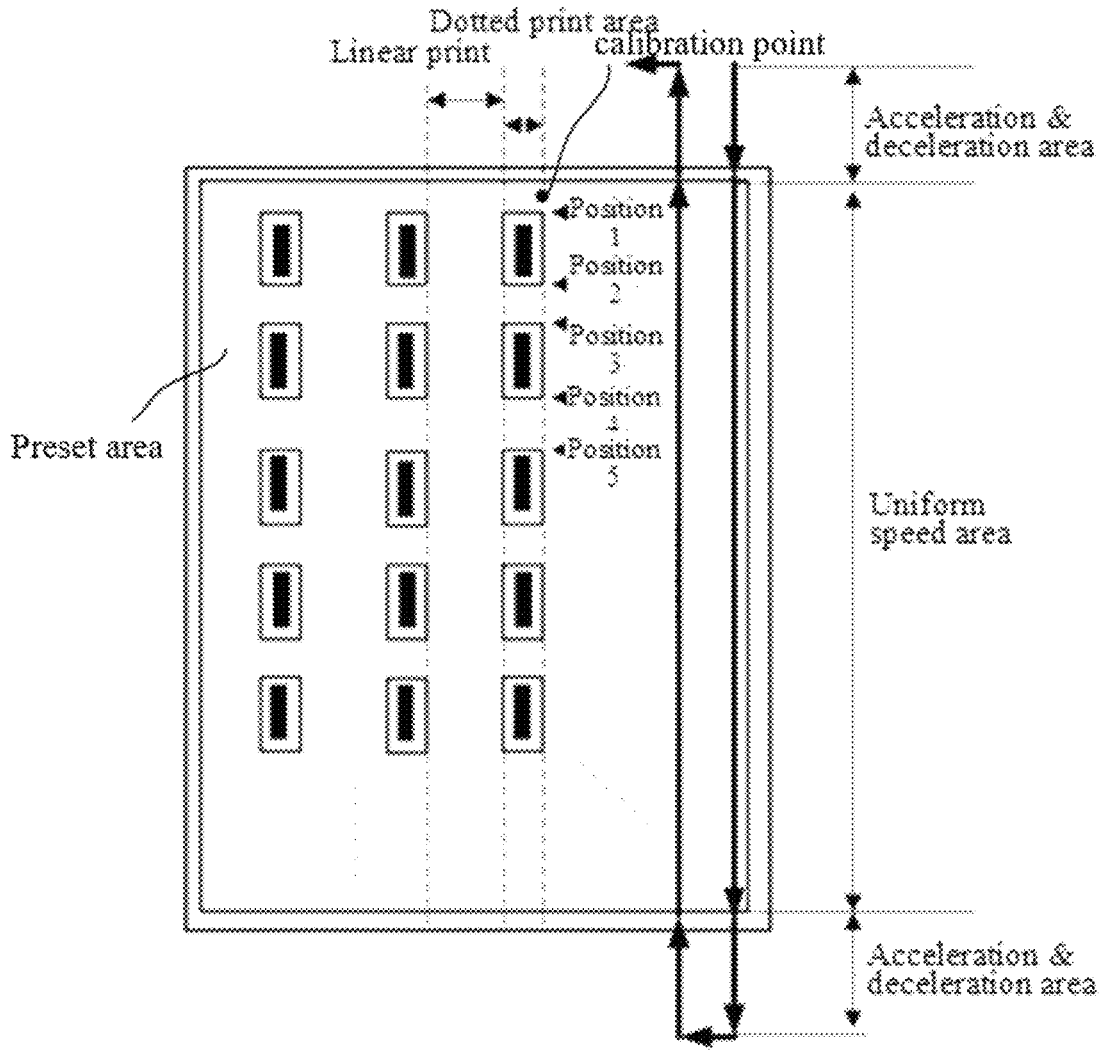
FIG. 4 is a schematic diagram of a process for printing a reflecting layer of a backlight panel provided by an embodiment of the present disclosure.

The schematic diagram of a process for printing the reflecting layer of the backlight panel provided by the embodiments of the present disclosure as shown in FIG. 4 may be referred here. As shown in FIG. 4, by taking the same type of the at least two piezoelectric injection valves as an example, when the reflecting layer of the backlight panel is printed, the at least two piezoelectric injection valves may be arranged above the upper edge of the backlight panel firstly, and controlled to move at accelerated speed along the plane Y-axis in the reverse direction to the upper edge of the backlight panel. In this process, each of the at least two piezoelectric injection valves is in the closed state. Then, the at least two piezoelectric injection valves may be controlled to move at uniform speed along the plane Y-axis in the reverse direction to the lower edge of the backlight panel, and in this process, each of the at least two piezoelectric injection valves is in the open state. Next, the at least two piezoelectric injection valves may be controlled to move at decelerated speed along the plane Y-axis in the reverse direction to a position below the lower edge of the backlight panel (till the moving speed of the at least two piezoelectric injection valves is decreased to 0), and move for a preset distance along the plane X-axis in a reverse direction. In this process, each of the at least two piezoelectric injection valves is in the closed state. The preset distance here may be determined according to the diameters of the nozzles of the at least two piezoelectric injection valves or the number of injection material layers corresponding to the reflecting layer. For example, but it is not limited to the following: when the large-nozzle piezoelectric injection valves are currently controlled to print, the large-nozzle piezoelectric injection valves may move along the plane X-axis in the reverse direction for the distance the same as the diameter of the nozzles thereof. Then, the at least two piezoelectric injection valves may be controlled to move at accelerated speed along the plane Y-axis in a forward direction to the lower edge of the backlight panel, and in this process, each of the at least two piezoelectric injection valves is in the closed state. Next, the at least two piezoelectric injection valves may be controlled to move at uniform speed along the plane Y-axis in the forward direction to the upper edge of the backlight panel, and in this process, each of the at least two piezoelectric injection valves is in the open state. Subsequently, the at least two piezoelectric injection valves are controlled to move at decelerated speed along the plane Y-axis in the forward direction to a position above the upper edge of the backlight panel (till the moving speed of the at least two piezoelectric injection valves is decreased to 0), and move for a preset distance along the plane X-axis in the reverse direction. In this process, each of the at least two piezoelectric injection valves is in the closed state.

Now, the at least two piezoelectric injection valves may be controlled to repeatedly move along the above-mentioned moving paths in corresponding states, till the at least two piezoelectric injection valves are controlled to move to the upper edge of the backlight panel above the first light-emitting diode (namely corresponding to a dotted print area). Then, the at least two piezoelectric injection valves are firstly controlled to move at uniform speed along the plane Y-axis in the reverse direction to a position 1 (which can also be construed as the upper edge of the first light-emitting diode), and now the at least two piezoelectric injection valves are regulated from the open state to the closed state, and continuously controlled to move at uniform speed along the plane Y-axis in the reverse direction. When the at least two piezoelectric injection valves move at uniform speed along the plane Y-axis in the reverse direction to a position 2 (which can also be construed as the lower edge of the first light-emitting diode), the at least two piezoelectric injection valves are regulated from the closed state to the open state, and continuously controlled to move at uniform speed along the plane Y-axis in the reverse direction. When the at least two piezoelectric injection valves move at uniform speed along the plane Y-axis in the reverse direction to a position 3 (which can also be construed as the upper edge of a second light-emitting diode), the at least two piezoelectric injection valves are regulated from the open state to the closed state, and continuously controlled to move at uniform speed along the plane Y-axis in the reverse direction. When the at least two piezoelectric injection valves move at uniform speed along the plane Y-axis in the reverse direction to a position 4 (which can also be construed as the lower edge of the second light-emitting diode), the at least two piezoelectric injection valves are regulated from the closed state to the open state, and continuously controlled to move at uniform speed along the plane Y-axis in the reverse direction. When the at least two piezoelectric injection valves move along the plane Y-axis in the reverse direction to a position 5 (which can also be construed as the upper edge of the third light-emitting diode), the at least two piezoelectric injection valves are regulated from the open state to the closed state, and continuously controlled to move at uniform speed along the plane Y-axis in the reverse direction. The at least two piezoelectric injection valves may be controlled to repeatedly move along the above-mentioned moving paths in the corresponding states, till the reflecting layer of the whole backlight panel is printed.

Figure 5A:
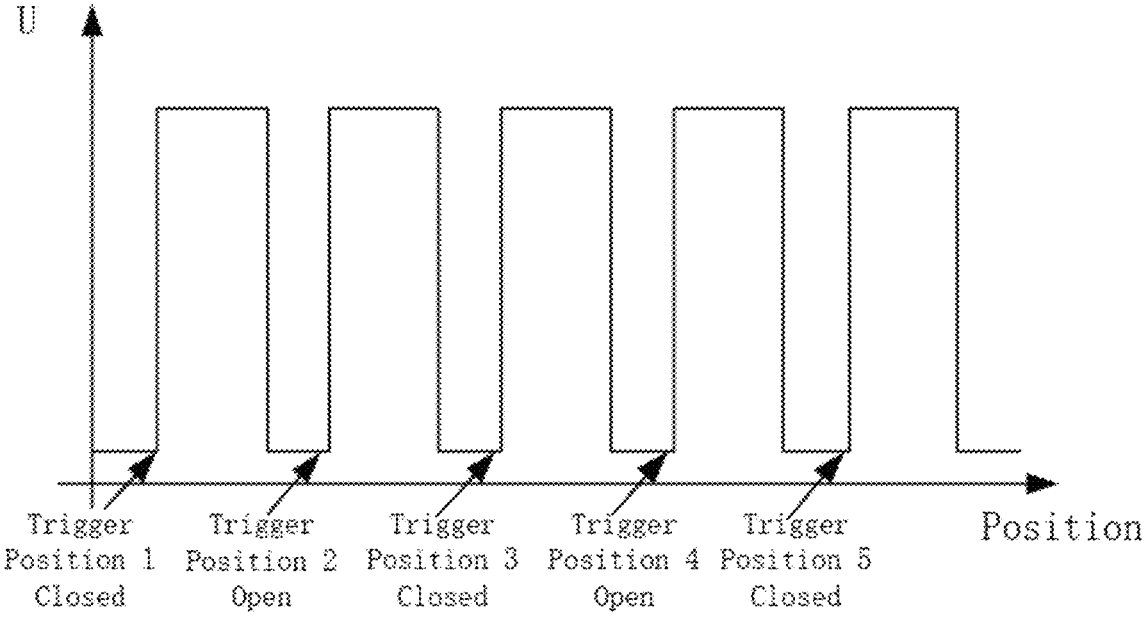
FIG. 5*a* is a schematic diagram of trigger states of at least two piezoelectric injection valves provided by an embodiment of the present disclosure.
Figure 5B:
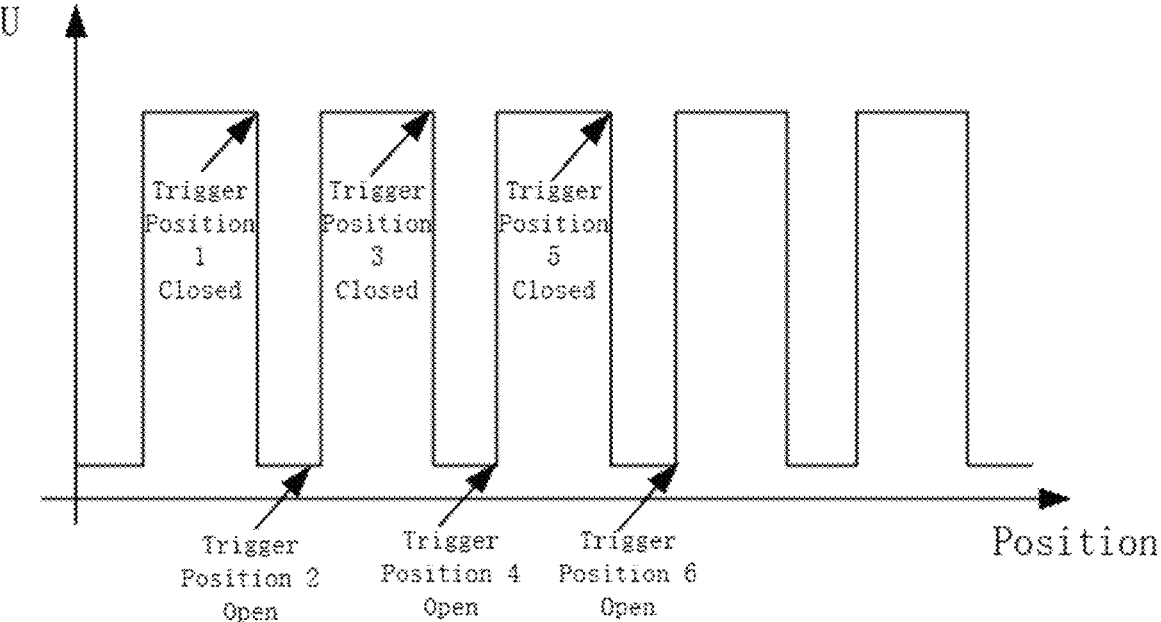
FIG. 5*b* is a schematic diagram of trigger states of at least two piezoelectric injection valves provided by an embodiment of the present disclosure.

Wherein, the schematic diagram of trigger states of at least two piezoelectric injection valves provided by the embodiments of the present disclosure as shown in FIG. 5a or FIG. 5b may also be referred. As shown in FIG. 5a, when the at least two piezoelectric injection valves are in the position 1, that is, the corresponding pulse signals are about to be converted from low level to high level, the at least two piezoelectric injection valves may be controlled and regulated from the open state to the closed state. When the at least two piezoelectric injection valves are in the position 2, that is, the corresponding pulse signals are firstly converted from high level to low level, and then are about to be converted from low level to high level, the at least two piezoelectric injection valves may be controlled and regulated from the closed state to the open state. When the at least two piezoelectric injection valves are in the position 3, that is, the corresponding pulse signals are firstly converted from high level to low level, and then are about to be converted from low level to high level, the at least two piezoelectric injection valves may be controlled and regulated from the open state to the closed state. When the at least two piezoelectric injection valves are in the position 4, that is, the corresponding pulse signals are firstly converted from high level to low level, and then are about to be converted from low level to high level, the at least two piezoelectric injection valves may be controlled and regulated from the closed state to the open state. When the at least two piezoelectric injection valves are in the position 5, that is, the corresponding pulse signals are firstly converted from high level to low level, and then are about to be converted from low level to high level, the at least two piezoelectric injection valves may be controlled and regulated from the open state to the closed state, and the above operations are repeated in sequence.

Or as shown in FIG. 5b, when the at least two piezoelectric injection valves are in the position 1, that is, the corresponding pulse signals are firstly converted from low level to high level, and then are about to be converted from high level to low level, the at least two piezoelectric injection valves may be controlled and regulated from the open state to the closed state. When the at least two piezoelectric injection valves are in the position 2, that is, the corresponding pulse signals are firstly converted from high level to low level, and then are about to be converted from low level to high level, the at least two piezoelectric injection valves may be controlled and regulated from the closed state to the open state. When the at least two piezoelectric injection valves are in the position 3, that is, the corresponding pulse signals are firstly converted from low level to high level, and then are about to be converted from high level to low level, the at least two piezoelectric injection valves may be controlled and regulated from the open state to the closed state. When the at least two piezoelectric injection valves are in the position 4, that is, the corresponding pulse signals are firstly converted from high level to low level, and then are about to be converted from low level to high level, the at least two piezoelectric injection valves may be controlled and regulated from the closed state to the open state. When the at least two piezoelectric injection valves are in the position 5, that is, the corresponding pulse signals are firstly converted from low level to high level, and then are about to be converted from high level to low level, the at least two piezoelectric injection valves may be controlled and regulated from the open state to the closed state. When the at least two piezoelectric injection valves are in the position 6, that is, the corresponding pulse signals are firstly converted from high level to low level, and then are about to be converted from low level to high level, the at least two piezoelectric injection valves may be controlled and regulated from the closed state to the open state, and the above operations are repeated in sequence.

Figure 6:
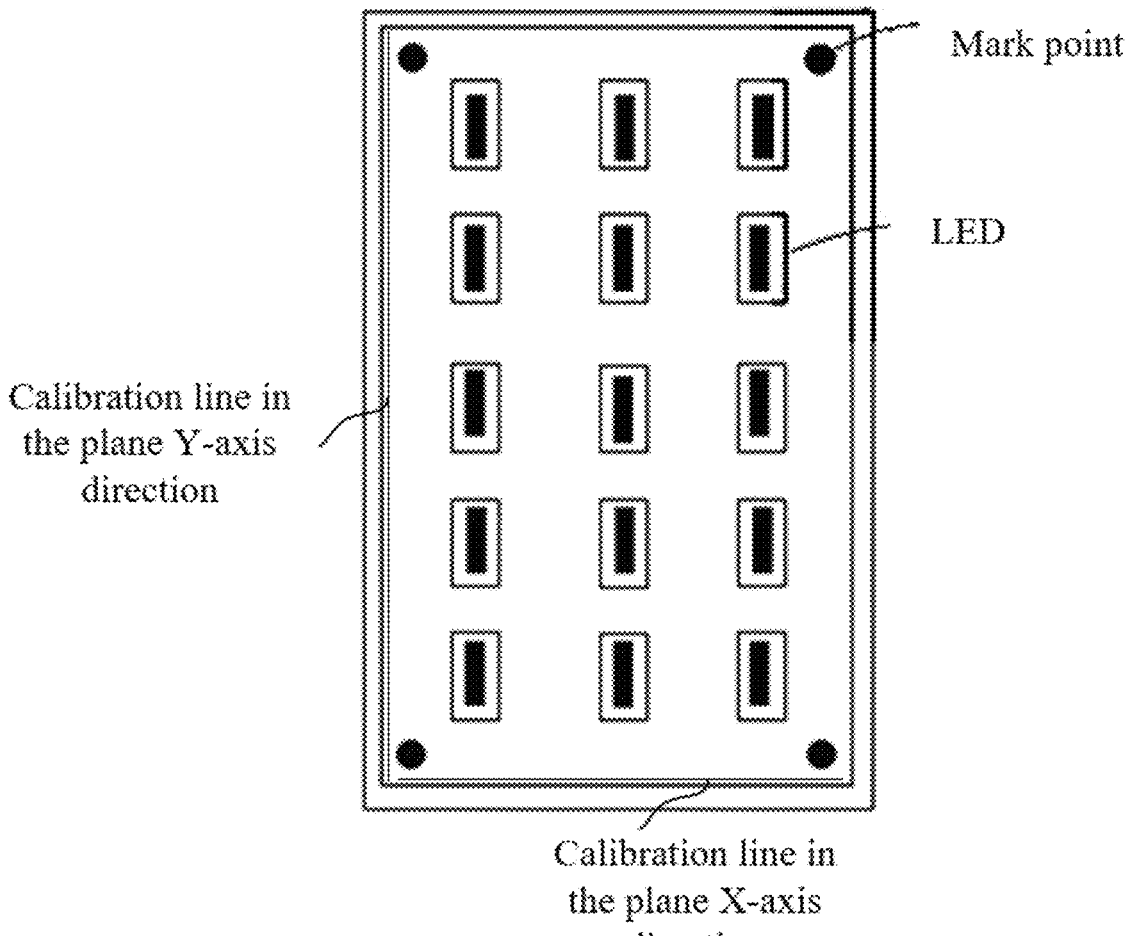
FIG. 6 is a schematic plan of a backlight panel provided by an embodiment of the present disclosure.

It is understandable that the embodiments of the present disclosure may be not limited to the trigger manners of the at least two piezoelectric injection valves as shown in FIG. 6, which will not be described here in detail.

In one optional embodiment of the present disclosure, referring to FIG. 13, the process of performing first correction processing on the at least two piezoelectric injection valves further includes:

Step 302, shapes of nozzles of the at least two piezoelectric injection valves are acquired based on a first camera, and a distance between any two adjacent piezoelectric injection valves among the at least two piezoelectric injection valves is determined according to the shapes of the nozzles, wherein the first camera is arranged below the at least two piezoelectric injection valves; and Step 304, the distance between any two adjacent piezoelectric injection valves is regulated according to a second preset distance.

Specifically, each of the at least two piezoelectric injection valves may be firstly controlled to move to a position directly above the first camera, and then each piezoelectric injection valve may be controlled to make a vertically downward movement, till the first camera may clearly identify an inner circle and an outer circle of the nozzle of each piezoelectric injection valve, and the distance between the centers of circles of the nozzles of any two adjacent piezoelectric injection valves may be determined by a vision algorithm.

Furthermore, the distance between the centers of circles of the nozzles of any two adjacent piezoelectric injection valves may be regulated according to the preset distance, so that the distance between the centers of circles of the nozzles of any two adjacent piezoelectric injection valves meets the requirement of the preset distance. Wherein, the preset distance may be determined according to the dimensions of the backlight panel on which the reflecting layer is to be printed, but is not limited thereto. For example, the preset distance between the centers of circles of the nozzles of any two adjacent piezoelectric injection valves in each row of the at least two piezoelectric injection valves may be determined according to the length of the surface of the backlight panel on which the reflecting layer is to be printed, and the preset distance between the centers of circles of the nozzles of any two adjacent piezoelectric injection valves in each column of the at least two piezoelectric injection valves may be determined according to the width of the surface of the backlight panel on which the reflecting layer is to be printed.

It is understandable that the first camera may be an upside-down camera arranged below the at least two piezoelectric injection valves, and the adopted vision algorithm may be a conventional technical means in the art, which will not be described detailedly in the present disclosure.

In another optional embodiment of the present disclosure, referring to FIG. 14, the process of performing first correction processing on the at least two piezoelectric injection valves further includes:

Step 402, any one of the at least two piezoelectric injection valves is controlled to print a calibration point in a preset area;

Step 404, the calibration point is identified based on a second camera, and an initial position of the piezoelectric injection valve corresponding to the calibration point is determined, wherein the second camera is arranged above the at least two piezoelectric injection valves; and Step 406, an initial position of each of the at least two piezoelectric injection valves is determined according to the regulated distance between any two adjacent piezoelectric injection valves and the initial position of the piezoelectric injection valve corresponding to the calibration point.

Specifically, after the shapes of the nozzles of the at least two piezoelectric injection valves are acquired based on the first camera, and the distance between any two adjacent piezoelectric injection valves is regulated according to the preset distance, any one of the at least two piezoelectric injection valves may also be controlled to print the calibration point in the preset area in order to ensure the accuracy of the at least two piezoelectric injection valves, wherein the preset area may be, but is not limited to, any area on a substrate, where one or more calibration points may be printed.

Furthermore, the calibration point printed by any one of the piezoelectric injection valves may be identified based on the second camera, for example, but it is not limited to the following: the second camera may be controlled to move to a position directly above the calibration point, and the initial position of the piezoelectric injection valve corresponding to the calibration point is determined by the vision algorithm. Wherein, the initial position may be construed as coordinates corresponding to the calibration point in a rectangular plane coordinate system, and the rectangular plane coordinate system may be built based on the substrate, but is not limited thereto.

Furthermore, after the initial position of the piezoelectric injection valve corresponding to the calibration point is determined, as the distance between any two adjacent piezoelectric injection valves has been regulated according to the preset distance, the initial position of each of the at least two piezoelectric injection valves may be determined here according to the initial position of the piezoelectric injection valve corresponding to the calibration point and the regulated distance between any two adjacent piezoelectric injection valves. For example, the initial position of the piezoelectric injection valve located in Row 1, Column 1 among the at least two piezoelectric injection valves may be firstly determined, and then the initial position of the piezoelectric injection valve located in Row 1, Column 2 is determined according to the regulated distance between the piezoelectric injection valve located in Row 1, Column 1 and the piezoelectric injection valve located in Row 1, Column 2. The initial position of the piezoelectric injection valve located in Row 2, Column 1 is determined according to the regulated distance between the piezoelectric injection valve located in Row 1, Column 1 and the piezoelectric injection valve located in Row 2, Column 1, and the initial position of each of the at least two piezoelectric injection valves is deduced in sequence.

It is understandable that the second camera may be a top vertical camera arranged above the at least two piezoelectric injection valves, and the adopted vision algorithm may be a conventional technical means in the art, which will not be described detailedly in the present disclosure.

In the embodiments of the present disclosure, the initial position of each of the at least two piezoelectric injection valves may also be determined by the first camera and the second camera in sequence finally, but is not limited thereto. For example, each of the at least two piezoelectric injection valves may be controlled to print the calibration point in the preset area, and the calibration point printed by each piezoelectric injection valve is identified by the second camera in sequence, and the distance between two adjacent piezoelectric injection valves may be regulated according to the above-mentioned preset distance after identification, to finally determine the initial position of each of the at least two piezoelectric injection valves. Specifically, the piezoelectric injection valve located in Row 1, Column 1 among the at least two piezoelectric injection valves may be firstly controlled to print the calibration point in the preset area, and the calibration point is identified by the second camera, to determine the initial position of the piezoelectric injection valve located in Row 1, Column 1; then, the piezoelectric injection valve located in Row 1, Column 2 among the at least two piezoelectric injection valves may be controlled to print the calibration point in the preset area, and the calibration point is identified by the second camera, the position of the piezoelectric injection valve located in Row 1, Column 2 is regulated according to the preset distance between the piezoelectric injection valve located in Row 1, Column 1 and the piezoelectric injection valve located in Row 1, Column 2. The initial position of the piezoelectric injection valve located in Row 1, Column 2 may be determined, till the initial position of each piezoelectric injection valve is determined.

In yet another optional embodiment of the present disclosure, referring to FIG. 15, after the first correction processing is performed on the at least two piezoelectric injection valves, and before the specification parameters of the backlight panel are acquired and the moving paths of the at least two piezoelectric injection valves are generated according to the specification parameters of the backlight panel, the method further includes:

Step 502, mark points on the backlight panel are identified based on the second camera, wherein at least two mark points on the backlight panel are provided;

Step 504, whether a line formed by connecting any two adjacent mark points on the backlight panel is parallel to a calibration line set on a substrate is judged;

Step 506, second correction processing is performed on the backlight panel until the line formed by connecting any two adjacent mark points on the backlight panel is parallel to the calibration line set on the substrate if it is determined that the line formed by connecting any two adjacent mark points on the backlight panel is not parallel to the calibration line set on the substrate; and Step 508, a print position of the piezoelectric injection valve corresponding to the calibration point is determined according to the mark points of the corrected backlight panel, and a print position of each of the at least two piezoelectric injection valves is calculated according to the print position of the piezoelectric injection valve corresponding to the calibration point and the initial position of the piezoelectric injection valve corresponding to the calibration point.

Specifically, after the calibration point is identified based on the second camera and the initial position of the piezoelectric injection valve corresponding to the calibration point and the initial position of each of the at least two piezoelectric injection valves are determined, the backlight panel may also be disposed on the substrate, and the mark points set on the backlight panel are identified again based on the second camera, to judge whether the line formed by connecting any two adjacent mark points on the backlight panel is parallel to the calibration line set on the substrate. Wherein, at least two mark points on the backlight panel may be provided, and the line formed by connecting any two adjacent mark points may correspond to the calibration line set on the substrate. For example, the schematic plan of the backlight panel provided by the embodiments of the present disclosure as shown in FIG. 6 may be referred here. FIG. 6 is the schematic plan of the backlight panel. As shown in FIG. 6, the backlight panel may include, but is not limited to, light-emitting diodes (LEDs) arranged in five rows and three columns. A mark point may be set at the corresponding position of each of four vertexes of the backlight panel, wherein a line formed by connecting the mark point corresponding to the upper left vertex with the mark point corresponding to the lower left vertex may be parallel to a line formed by connecting the mark point corresponding to the upper right vertex with the mark point corresponding to the lower right vertex; a line formed by connecting the mark point corresponding to the upper left vertex with the mark point corresponding to the upper right vertex may be parallel to a line formed by connecting the mark point corresponding to the lower left vertex with the mark point corresponding to the lower right vertex. Any two adjacent connecting lines are perpendicular to each other. On this basis, the length of the calibration line set on the substrate may be in preset proportion to that of the line formed by connecting any two adjacent mark points, but is not limited thereto. As the substrate is located below the at least two piezoelectric injection valves, and the position of the substrate is relatively fixed, the calibration line in the plane Y-axis direction may be parallel to a moving track of the at least two piezoelectric injection valves on the plane Y-axis, and the calibration line in the plane X-axis direction may be parallel to a moving track of the at least two piezoelectric injection valves on the plane X-axis.

It is understandable that if the above-mentioned line formed by connecting the mark point corresponding to the upper left vertex with the mark point corresponding to the lower left vertex, or the line formed by connecting the mark point corresponding to the upper right vertex with the mark point corresponding to the lower right vertex is not parallel to the calibration line in the plane Y-axis direction, it may be understood that the position of the backlight panel on the substrate is incorrect (that is, it is determined that the line formed by connecting any two adjacent mark points on the backlight panel is not parallel to the calibration line set on the substrate), and consequently the reflecting layer of the backlight panel cannot be accurately printed by the at least two piezoelectric injection valves. Certainly, if the above-mentioned line formed by connecting the mark point corresponding to the upper left vertex with the mark point corresponding to the upper right vertex, or the line formed by connecting the mark point corresponding to the lower left vertex with the mark point corresponding to the lower right vertex is not parallel to the calibration line in the plane X-axis direction, it may also be understood that the position of the backlight panel on the substrate is incorrect (that is, it is determined that the line formed by connecting any two adjacent mark points on the backlight panel is not parallel to the calibration line set on the substrate), and consequently the reflecting layer of the backlight panel cannot be accurately printed by the at least two piezoelectric injection valves.

Furthermore, if it is determined that the line formed by connecting any two adjacent mark points on the backlight panel is not parallel to the calibration line set on the substrate, the backlight panel may be subjected to rotational processing on the substrate, so that the line formed by connecting any two adjacent mark points on the backlight panel is parallel to the calibration line set on the substrate.

It is understandable that the moving track of the at least two piezoelectric injection valves on a plane may be parallel to the line formed by connecting any two adjacent mark points on the backlight panel by turning the nozzles of the at least two piezoelectric injection valves in the embodiments of the present disclosure to change the injection direction, but is not limited thereto.

Furthermore, after it is determined that the line formed by connecting any two adjacent mark points on the backlight panel is parallel to the calibration line set on the substrate, the print position of the piezoelectric injection valve corresponding to the calibration point may be determined according to the mark points on the backlight panel firstly. Wherein, the coordinates corresponding to the mark points on the backlight panel may be firstly determined, and the coordinates of the piezoelectric injection valve corresponding to the calibration point are calculated according to the coordinates corresponding to the mark points, but the manner is not limited thereto. It is understandable that the coordinates of the piezoelectric injection valve corresponding to the calibration point may be construed as the print position of the piezoelectric injection valve corresponding to the calibration point.

Furthermore, after calculation of the print position of the piezoelectric injection valve corresponding to the calibration point, the moving track from the initial position to the print position may be firstly determined according to the initial position of the piezoelectric injection valve corresponding to the calibration point, and the print position of each piezoelectric injection valve may be calculated based on the moving track and the initial position of each of the at least two piezoelectric injection valves, so as to control each of the at least two piezoelectric injection valves to move to its corresponding print position.

In still yet another optional embodiment of the present disclosure, the at least two piezoelectric injection valves include at least two large-nozzle piezoelectric injection valves and at least two small-nozzle piezoelectric injection valves;

Referring to FIG. 18, the process of performing first correction processing on the at least two piezoelectric injection valves further includes:

Step 802, an adhesive quality of each large-nozzle piezoelectric injection valve is acquired within the same time interval, and whether the adhesive quality of each large-nozzle piezoelectric injection valve is consistent with a first preset mass is judged;

Step 804, air pressure of each large-nozzle piezoelectric injection valve is regulated until the dispensing amount of each large-nozzle piezoelectric injection valve is consistent with the first preset mass if it is detected that the dispensing amount of each large-nozzle piezoelectric injection valve is not consistent with the first preset mass;

Step 806, a dispensing amount of each small-nozzle piezoelectric injection valve is acquired within the same time interval, and whether the dispensing amount of each small-nozzle piezoelectric injection valve is consistent with a second preset mass is judged; and Step 808, the air pressure of each small-nozzle piezoelectric injection valve is regulated until the dispensing amount of each small-nozzle piezoelectric injection valve is consistent with the second preset mass if it is detected that the dispensing amount of each small-nozzle piezoelectric injection valve is not consistent with the second preset mass.

Specifically, whether the air pressure of each large-nozzle piezoelectric injection valve is consistent may be detected according to the dispensing amount of each large-nozzle piezoelectric injection valve within the same time; and possibly, if the dispensing amount of a certain large-nozzle piezoelectric injection valve is smaller than the first preset mass, the air pressure of such large-nozzle piezoelectric injection valve may be increased. Possibly, if the dispensing amount of a certain large-nozzle piezoelectric injection valve is larger than the first preset mass, the air pressure of such large-nozzle piezoelectric injection valve may be decreased. Certainly, in the embodiments of the present disclosure, it can also be ensured that the dispensing amount of each piezoelectric injection valve keeps consistent within the same time interval by controlling an injection period of each piezoelectric injection valve. For example, if it is detected that the dispensing amount of the large-nozzle piezoelectric injection valve is smaller than the first preset mass, the injection period of each large-nozzle piezoelectric injection valve may be controlled to increase, and within the increased injection time, only the large-nozzle piezoelectric injection valve with the dispensing amount smaller than the first preset mass is controlled to be in the open state, and all other large-nozzle piezoelectric injection valves are regulated to be in the closed state.

Then, whether the air pressure of each small-nozzle piezoelectric injection valve is consistent may also be detected according to the dispensing amount of each small-nozzle piezoelectric injection valve within the same time; and possibly, if the dispensing amount of a certain small-nozzle piezoelectric injection valve is smaller than the second preset mass, the air pressure of such small-nozzle piezoelectric injection valve may be increased. Possibly, if the dispensing amount of a certain small-nozzle piezoelectric injection valve is larger than the second preset mass, the air pressure of such small-nozzle piezoelectric injection valve may be decreased.

Certainly, in the embodiments of the present disclosure, it can also be ensured that the dispensing amount of each piezoelectric injection valve keeps consistent within the same time interval by controlling an injection period of each piezoelectric injection valve. For example, if it is detected that the dispensing amount of the small-nozzle piezoelectric injection valve is smaller than the second preset mass, the injection period of each small-nozzle piezoelectric injection valve may be controlled to increase, and within the increased injection time, only the small-nozzle piezoelectric injection valve with the dispensing amount smaller than the first preset mass is controlled to be continuously in the open state, and all other small-nozzle piezoelectric injection valves are regulated to be in the closed state.

It is understandable that the dispensing amount of each piezoelectric injection valve may be determined by, but not limited to, firstly moving each piezoelectric injection valve to the position above a balance, and then recording the dispensing amount of each piezoelectric injection valve within the same time by the balance.

In still yet another optional embodiment of the present disclosure, referring to FIG. 19, the process of performing first correction processing on the at least two piezoelectric injection valves further includes:

Step 902, pre-heating is performed on the at least two piezoelectric injection valves, so that temperatures at nozzles of the at least two piezoelectric injection valves are within a preset temperature interval.

Specifically, as the expansion and shrinkage of piezoelectric ceramics resulting from high-frequency deformation of the piezoelectric injection valves and friction impact of a tappet may generate a large amount of heat which affects the temperature change of a valve body. When the temperature of a valve body changes, the dispensing amount may fluctuate due to white oil reflecting materials which are sensitive to temperature. So, the white oil reflecting materials need to be subjected to pre-heating at outlet flow channels of the piezoelectric injection valves, to control the outlet temperature of the piezoelectric injection valves between 30° C. and 45° C. Certainly, in the embodiments of the present disclosure, the temperature may be controlled between 30° C. and 45° C., but is not limited thereto.

Figure 7:
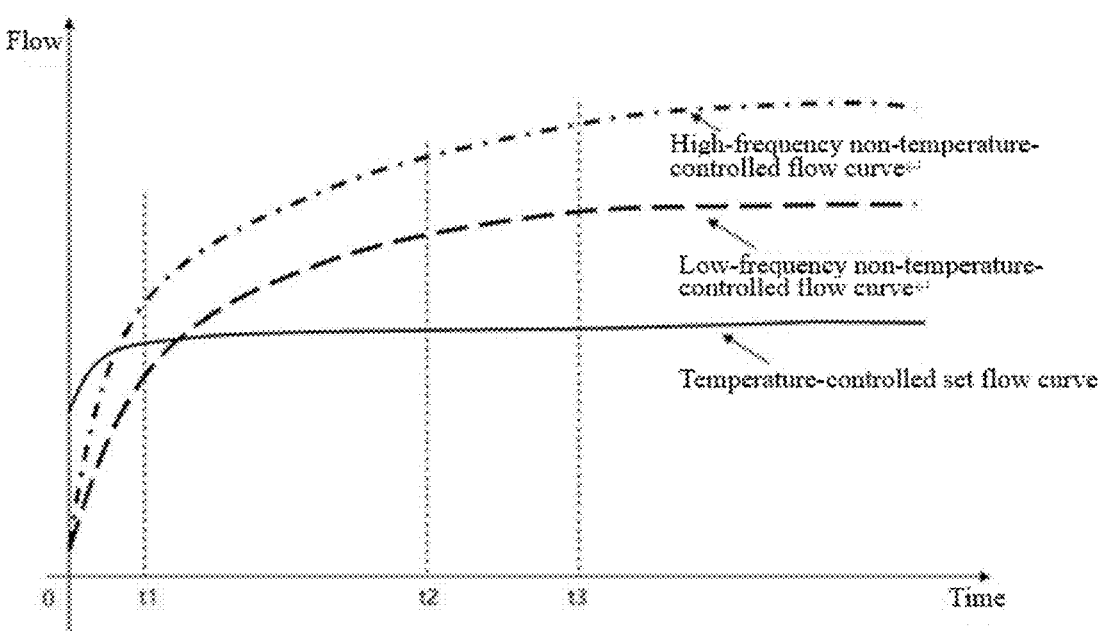
FIG. 7 is a schematic diagram showing flow variation curves of one type of at least two piezoelectric injection valves provided by an embodiment of the present disclosure.

The schematic diagram of flow variation curves of one type of the at least two piezoelectric injection valves provided by the embodiments of the present disclosure as shown in FIG. 7 may be referred here. As shown in FIG. 7, when the at least two piezoelectric injection valves are in a high-frequency non-temperature-controlled state for printing the reflecting layer, the injection flow fluctuation of the nozzles thereof is excessively obvious, which easily affects the thickness of the reflecting layer. When the at least two piezoelectric injection valves are in a low-frequency non-temperature-controlled state for printing the reflective layer, the injection flow fluctuation of the nozzles thereof is still obvious, which may also affect the thickness of the reflecting layer. When the at least two piezoelectric injection valves are in a temperature-controlled state for printing the reflecting layer, the injection flow fluctuation of the nozzles thereof tends to be stable, which easily ensures that the thickness of the reflecting layer remains consistent all the time.

In still yet another optional embodiment of the present disclosure, before the at least two corrected piezoelectric injection valves are controlled to print according to the moving paths, the method further includes:

a diluent with a first preset concentration is fused with a leveling agent with a second preset concentration, to obtain printing materials of the at least two corrected piezoelectric injection valves;

the process of controlling the at least two corrected piezoelectric injection valves to print according to the moving paths includes:

the at least two corrected piezoelectric injection valves are filled with the printing materials, and the at least two corrected piezoelectric injection valves are controlled to print according to the moving paths.

Specifically, the diluent with a first preset concentration is used so that the viscosity range of the materials of the reflecting layer is controlled between 1,000 mPas and 10,000 mPas, and the leveling agent with a second preset concentration is used so that the materials is properly fused after being injected onto the substrate. Certainly, in the embodiments of the present disclosure, the viscosity range may be controlled between 1,000 mPas and 10,000 mPas, but is not limited thereto.

In still yet another optional embodiment of the present disclosure, before the at least two corrected piezoelectric injection valves are controlled to print according to the moving paths, the method further includes:

a surface of the backlight panel is cleaned.

Specifically, in order to ensure the appearance and accuracy of mineral oil openings around LEDs on the backlight panel, after die bonding of the backlight panel, the surface of the backlight panel may be cleaned by a plasma cleaner, to reduce influence of rosin flux remaining in the previous die-bonding process on the appearance of the white oil openings. Wherein, when the surface of the substrate is cleaned by the plasma cleaner, process gas may be set as mixed gas of Ar and $O_2$, gas flow may be controlled between 30 sccm and 100 sccm, power is controlled between 100 W and 300 W, and cleaning time is controlled between 30 s and 100 s. Certainly, in the embodiments of the present disclosure, the above parameters may be controlled within the above-mentioned corresponding ranges, but are not limited thereto.

In still yet another optional embodiment of the present disclosure, after the at least two corrected piezoelectric injection valves are controlled to print according to the moving paths, the method further includes:

curing is performed on the printed reflecting layer of the backlight panel.

Specifically, if it is determined that the materials for printing the reflecting layer are UV (ultraviolet) curing materials, a curing height of a UV strip light may be firstly determined after printing of the reflecting layer. A distance between the UV strip light and the substrate is regulated to the curing height, and the UV strip light may be controlled to do reciprocating motion on the surface of the reflecting layer of the backlight panel along the plane Y-axis, to perform curing on the reflecting layer of the backlight panel. It is understandable that the UV strip light may be arranged on a gantry structure shown in FIG. 2, but is not limited thereto.

If it is determined that the materials for printing the reflecting layer are thermocuring materials, the reflecting layer may be transferred to a next process and thermally cured in an oven after printing of the reflecting layer.

In still yet another optional embodiment of the present disclosure, after the at least two corrected piezoelectric injection valves are controlled to print according to the moving paths, the method further includes:

the at least two piezoelectric injection valves are moved to a cleaning area, and each piezoelectric injection valve is cleaned.

Specifically, after printing of the reflecting layer, the at least two piezoelectric injection valves may be controlled to move to the cleaning area, and the at least two piezoelectric injection valves are soaked in sponge containing a reflecting layer cleaning solvent for 1 s to 2 s. It is understandable that, after cleaning, the at least two piezoelectric injection valves may be controlled to move to a dust-free cloth area, and each piezoelectric injection valve is wiped to remove the solvent and the materials of the reflecting layer therefrom.

Figure 8:
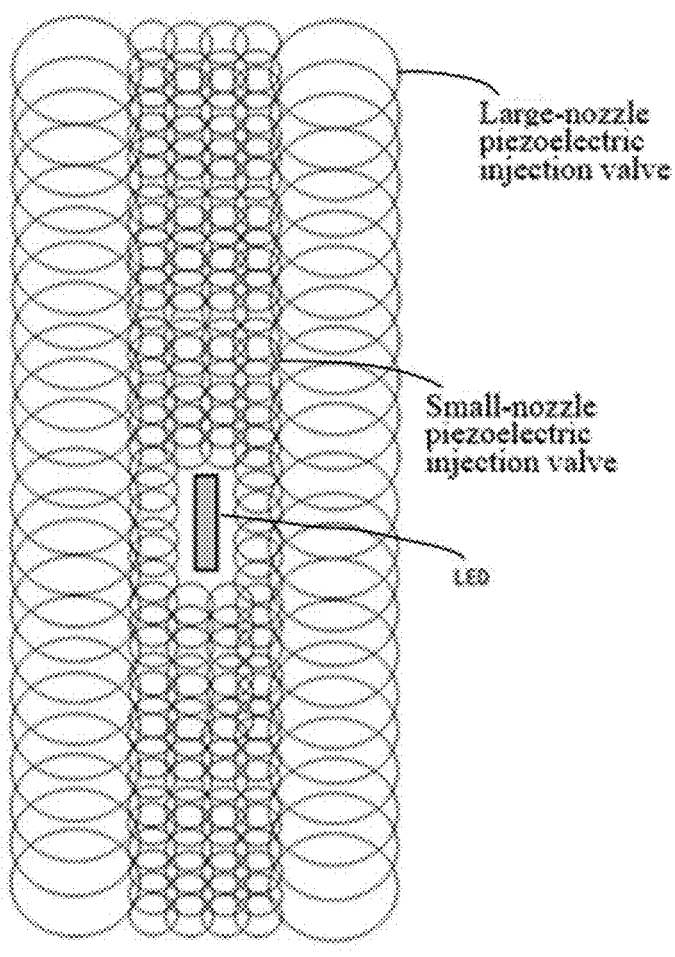
FIG. 8 is a schematic diagram showing a printing effect of another type of at least two piezoelectric injection valves provided by an embodiment of the present disclosure.

The schematic diagram showing the printing effect of another type of the at least two piezoelectric injection valves provided by the embodiments of the present disclosure as shown in FIG. 8 may be referred here.

As shown in FIG. 8, the at least two piezoelectric injection valves may include large-nozzle piezoelectric injection valves and small-nozzle piezoelectric injection valves, wherein the inner diameter of a nozzle of each large-nozzle piezoelectric injection valve may be set between 0.15 mm and 0.3 mm, but is not limited thereto, and temperature is set as $T1$; the inner diameter of a nozzle of each small-nozzle piezoelectric injection valve may be set between 0.075 mm and 0.1 mm, but is not limited thereto, and temperature is set as $T2$; and the temperatures may be controlled as 45° C.>$T1$>$T2$>room temperature (25° C.), and is controlled thermostatically for 20 min in advance. Certainly, in the embodiments of the present disclosure, the above parameters may be controlled within the above-mentioned corresponding ranges, but are not limited thereto.

Specifically, the large-nozzle piezoelectric injection valves may be controlled in the open state and the small-nozzle piezoelectric injection valves are controlled in the closed state in the first print area excluding light-emitting diodes firstly, and the piezoelectric injection valves move along the edge of the first print area towards the second print area including all light-emitting diodes. Wherein, the moving track of the large-nozzle piezoelectric injection valves may be, but is not limited to, moving from the upper edge of the backlight panel to the lower edge of the backlight panel at uniform speed along the plane Y-axis in the reverse direction. It is understandable that, in the present disclosure, the large-nozzle piezoelectric injection valves may also move along the plane X-axis in the forward direction for a preset distance (not shown in FIG. 8), then move from the lower edge of the backlight panel at uniform speed along the plane Y-axis in the forward direction to the upper edge of the backlight panel (not shown in FIG. 8), and may repeatedly move along the above-mentioned moving track of the large-nozzle piezoelectric injection valves till the large-nozzle piezoelectric injection valves move to the second print area. Here, the preset distance here may be determined according to the diameter of the nozzles of the at least two piezoelectric injection valves or the number of injection material layers corresponding to the reflecting layer. For example, but it is not limited to the following: when the large-nozzle piezoelectric injection valves are currently controlled to print, the large-nozzle piezoelectric injection valves may move along the plane X-axis in the reverse direction for the distance the same as the diameter of the nozzles of the large-nozzle piezoelectric injection valves.

Furthermore, the large-nozzle piezoelectric injection valves may be controlled in the closed state and the small-nozzle piezoelectric injection valves are controlled in the open state in the second print area firstly, and the piezoelectric injection valves are controlled to move from the lower edge of the backlight panel to the upper edge of the backlight panel at uniform speed along the plane Y-axis in the forward direction. Wherein, when the small-nozzle piezoelectric injection valves located directly above the light-emitting diodes move from the lower edges of the light-emitting diodes to the upper edges of the light-emitting diodes at uniform speed, the small-nozzle piezoelectric injection valves located above the light-emitting diodes may be controlled in the closed state, and the small-nozzle piezoelectric injection valves located directly above the light-emitting diodes are regulated from the closed state to the open state when passing the light-emitting diodes. It is understandable that the above-mentioned moving track of the small-nozzle piezoelectric injection valves may also be repeated in the present disclosure, and the small-nozzle piezoelectric injection valves may also move along the plane X-axis for the distance corresponding to the diameter of the nozzles of the small-nozzle piezoelectric injection valves, till the small-nozzle piezoelectric injection valves move to the first print area.

Furthermore, the large-nozzle piezoelectric injection valves may be re-controlled in the open state and the small-nozzle piezoelectric injection valves are controlled in the closed state in the first print area, and the piezoelectric injection valves are controlled to move from the upper edge of the backlight panel to the lower edge of the backlight panel at uniform speed along the plane Y-axis in the forward direction, and repeatedly move along the above-mentioned moving track of the large-nozzle piezoelectric injection valves and the moving track of the small-nozzle piezoelectric injection valves respectively, till the reflecting layer of the whole backlight panel is printed.

Figure 9:
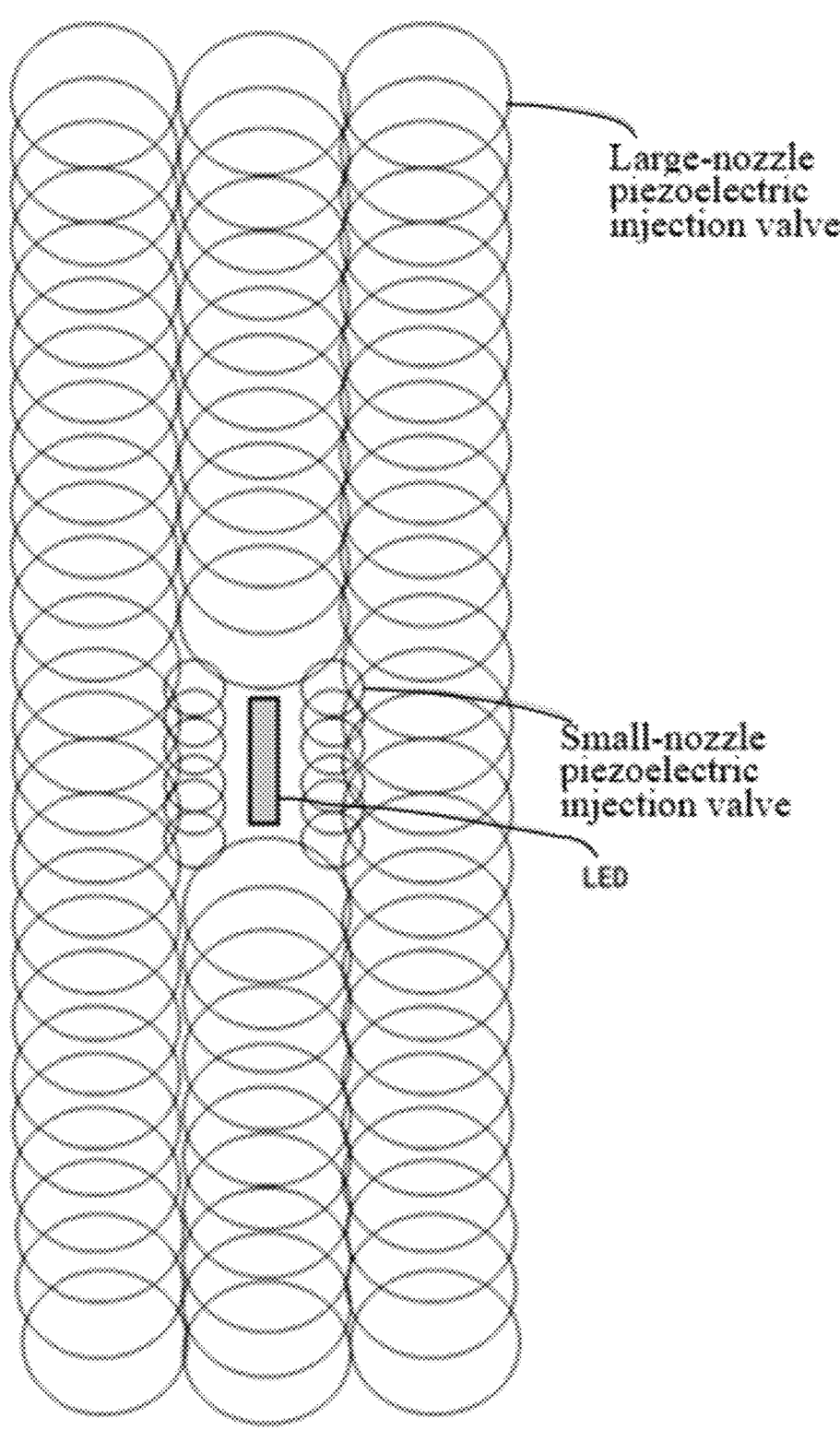
FIG. 9 is a schematic diagram showing a printing effect of yet another type of at least two piezoelectric injection valves provided by an embodiment of the present disclosure.

The schematic diagram showing the printing effect of yet another type of the at least two piezoelectric injection valves provided by the embodiments of the present disclosure as shown in FIG. 9 may be referred here.

As shown in FIG. 9, the at least two piezoelectric injection valves may include large-nozzle piezoelectric injection valves and small-nozzle piezoelectric injection valves, wherein the inner diameter of a nozzle of each large-nozzle piezoelectric injection valve may be set between 0.15 mm and 0.3 mm, but is not limited thereto, and temperature is set as T1; the inner diameter of a nozzle of each small-nozzle piezoelectric injection valve may be set between 0.075 mm and 0.1 mm, but is not limited thereto, and temperature is set as T2; and the temperatures may be controlled as 45° C.>T1>T2>room temperature (25° C.), and is controlled thermostatically for 20 min in advance. Certainly, in the embodiments of the present disclosure, the above parameters may be controlled within the above-mentioned corresponding ranges, but are not limited thereto.

Specifically, the large-nozzle piezoelectric injection valves may be controlled in the open state and the small-nozzle piezoelectric injection valves are controlled in the closed state in the first print area excluding light-emitting diodes firstly, and the piezoelectric injection valves move along the edge of the first print area to the second print area including all light-emitting diodes. Wherein, the moving track of the large-nozzle piezoelectric injection valves may be, but not limited to, moving from the upper edge of the backlight panel to the lower edge of the backlight panel at uniform speed along the plane Y-axis in the reverse direction. It is understandable that, in the present disclosure, the large-nozzle piezoelectric injection valves may also move along the plane X-axis in the forward direction for a preset distance (not shown in FIG. 9), then move from the lower edge of the backlight panel along the plane Y-axis in the forward direction to the upper edge of the backlight panel (not shown in FIG. 9), and may repeatedly move along the above-mentioned moving track of the large-nozzle piezoelectric injection valves till the large-nozzle piezoelectric injection valves move to the second print area. Here, the preset distance here may be determined according to the diameter of the nozzles of the at least two piezoelectric injection valves or the number of injection material layers corresponding to the reflecting layer. For example, but it is not limited to the following: when the large-nozzle piezoelectric injection valves are currently controlled to print, the large-nozzle piezoelectric injection valves may move along the plane X-axis in the reverse direction for the distance the same as the diameter of the nozzles of the large-nozzle piezoelectric injection valves.

Furthermore, the large-nozzle piezoelectric injection valves may be controlled to keep in the open state and the small-nozzle piezoelectric injection valves are controlled in the closed state in the second print area, and the piezoelectric injection valves are controlled to move from the lower edge of the backlight panel to the lower edges of the light-emitting diodes at uniform speed along the plane Y-axis in the forward direction. Then, the large-nozzle piezoelectric injection valves are controlled in the closed state and the small-nozzle piezoelectric injection valves are controlled in the open state, and the piezoelectric injection valves are controlled to move from the lower edge of the light-emitting diodes to the upper edge of the light-emitting diodes at uniform speed along the plane Y-axis in the forward direction. Wherein, the small-nozzle piezoelectric injection valves are symmetrically distributed on edges of two sides of the light-emitting diodes, rather than being directly above the light-emitting diodes. Next, the large-nozzle piezoelectric injection valves are controlled in the open state and the small-nozzle piezoelectric injection valves are controlled in the closed state, and the piezoelectric injection valves are controlled to move from the upper edges of the light-emitting diodes to the upper edge of the backlight panel at uniform speed along the plane Y-axis in the forward direction. It is understandable that the above-mentioned moving tracks of the small-nozzle piezoelectric injection valves and the large-nozzle piezoelectric injection valves may also be repeated in the present disclosure, and the large-nozzle piezoelectric injection valves may also move along the plane X axis for the distance corresponding to the diameter of the nozzles of the large-nozzle piezoelectric injection valves, till the large-nozzle piezoelectric injection valves move to the first print area.

Furthermore, the large-nozzle piezoelectric injection valves may be re-controlled in the open state and the small-nozzle piezoelectric injection valves are controlled in the closed state in the first print area, and the piezoelectric injection valves are controlled to move from the upper edge of the backlight panel to the lower edge of the backlight panel at uniform speed along the plane Y-axis in the forward direction, and repeat the above-mentioned moving tracks of the large-nozzle piezoelectric injection valves and the large-nozzle piezoelectric injection valves respectively, till the reflecting layer of the whole backlight panel is printed.

Figure 10:
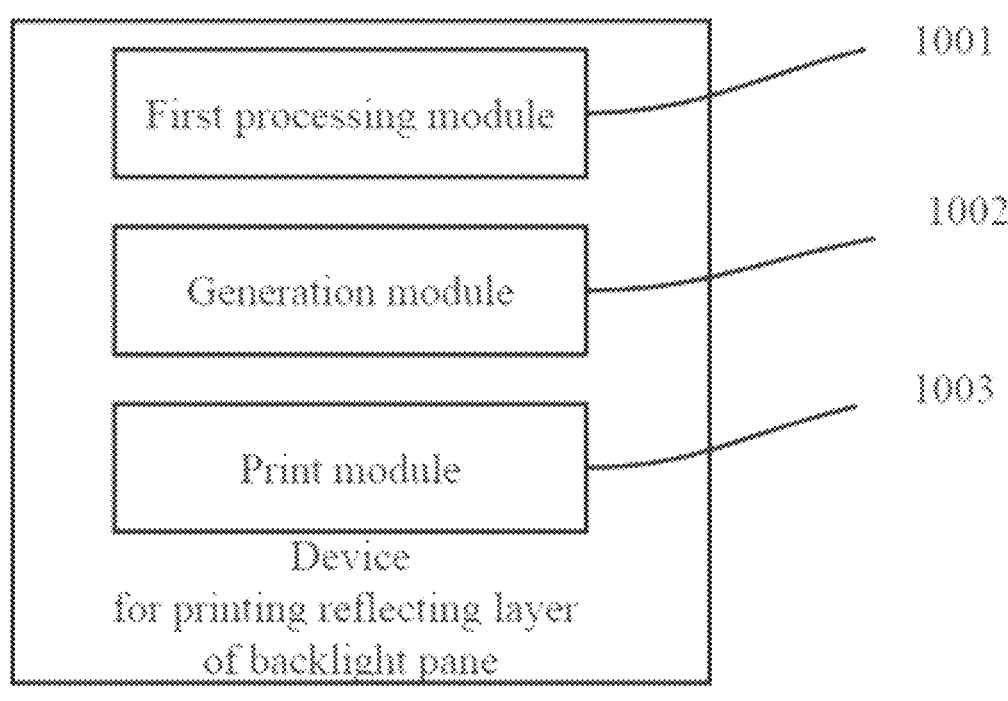
FIG. 10 is a structural schematic diagram of one device for printing a reflecting layer of a backlight panel provided by an embodiment of the present disclosure.

Referring to FIG. 10, FIG. 10 shows the structural schematic diagram of the device for printing the reflecting layer of the backlight panel provided by the embodiments of the present disclosure.

As shown in FIG. 10, the device for printing the reflecting layer of the backlight panel may at least include a first processing module 1001, a generation module 1002 and a print module 1003, wherein:

a first processing module 1001, configured to perform first correction processing on at least two piezoelectric injection valves;

a generation module 1002, configured to acquire specification parameters of the backlight panel and generate moving paths of the at least two piezoelectric injection valves according to the specification parameters of the backlight panel; and a print module 1003, configured to control the at least two corrected piezoelectric injection valves to print according to the moving paths.

In one embodiment, the first processing module includes:

a first control unit, configured to acquire a distance between each of the at least two piezoelectric injection valves and a substrate based on a contact sensor, and control the distance between each of the at least two piezoelectric injection valves and the substrate as a first preset distance, wherein the substrate is used for supporting the backlight panel.

In one embodiment, the first processing module further includes:

a first acquisition unit, configured to acquire shapes of nozzles of the at least two piezoelectric injection valves based on a first camera, and determine a distance between any two adjacent piezoelectric injection valves among the at least two piezoelectric injection valves according to the shapes of the nozzles, wherein the first camera is arranged below the at least two piezoelectric injection valves; and a second control unit, configured to regulate the distance between any two adjacent piezoelectric injection valves according to a second preset distance.

In one embodiment, the first processing module further includes:

a print unit, configured to control any one of the at least two piezoelectric injection valves to print a calibration point in a preset area;

an identification unit, configured to identify the calibration point based on a second camera, and determine an initial position of the piezoelectric injection valve corresponding to the calibration point, wherein the second camera is arranged above the at least two piezoelectric injection valves; and a third control unit, configured to determine an initial position of each of the at least two piezoelectric injection valves according to the regulated distance between any two adjacent piezoelectric injection valves and the initial position of the piezoelectric injection valve corresponding to the calibration point.

In one embodiment, the at least two piezoelectric injection valves include at least two large-nozzle piezoelectric injection valves and at least two small-nozzle piezoelectric injection valves;

the first processing module further includes:

a second acquisition unit, configured to acquire an adhesive quality of each large-nozzle piezoelectric injection valve within the same time interval, and judge whether the adhesive quality of each large-nozzle piezoelectric injection valve is consistent with a first preset mass;

a fourth control unit, configured to regulate air pressure of each large-nozzle piezoelectric injection valve until the adhesive quality of each large-nozzle piezoelectric injection valve is consistent with the first preset mass if it is detected that the adhesive quality of each large-nozzle piezoelectric injection valve is not consistent with the first preset mass;

a third acquisition unit, configured to acquire an adhesive quality of each small-nozzle piezoelectric injection valve within the same time interval, and judge whether the adhesive quality of each small-nozzle piezoelectric injection valve is consistent with a second preset mass;

a fifth control unit, configured to regulate air pressure of each small-nozzle piezoelectric injection valve until the adhesive quality of each small-nozzle piezoelectric injection valve is consistent with the second preset mass if it is detected that the adhesive quality of each small-nozzle piezoelectric injection valve is not consistent with the second preset mass;

In one embodiment, the first processing module further includes:

a heating unit, configured to perform pre-heating to the at least two piezoelectric injection valves so that the temperatures nozzles of the at least two piezoelectric injection valves are within a preset temperature interval.

In one embodiment, the device further includes:

a fusion module, configured to fuse a diluent with a first preset concentration and a leveling agent with a second preset concentration, to obtain printing materials of the at least two corrected piezoelectric injection valves before the at least two corrected piezoelectric injection valves are controlled to print according to the moving paths;

the print module is specifically configured to fill the at least two corrected piezoelectric injection valves with the printing materials, and control the at least two corrected piezoelectric injection valves to print according to the moving paths.

In one embodiment, the device further includes:

a first cleaning module, configured to clean the surface of the backlight panel before the at least two corrected piezoelectric injection valves are controlled to print according to the moving paths.

In one embodiment, the device further includes:

an identification module, configured to identify mark points on the backlight panel based on the second camera after first correction processing is performed on the at least two piezoelectric injection valves, and before the specification parameters of the backlight panel are acquired, and the moving paths of the at least two piezoelectric injection valves are generated according to the specification parameters of the backlight panel, wherein at least two mark points on the backlight panel are provided;

a judgment module, configured to judge whether a line formed by connecting any two adjacent mark points on the backlight panel is parallel to a calibration line set on a substrate;

a second processing module, configured to perform second correction processing on the backlight panel until the line formed by connecting any two adjacent mark points on the backlight panel is parallel to the calibration line set on the substrate if it is determined that the line formed by connecting any two adjacent mark points on the backlight panel is not parallel to the calibration line set on the substrate; and a calculation module, configured to determine a print position of the piezoelectric injection valve corresponding to the calibration point according to the mark points of the corrected backlight panel, and calculate a print position of each of the at least two piezoelectric injection valves according to the print position of the piezoelectric injection valve corresponding to the calibration point and the initial position of the piezoelectric injection valve corresponding to the calibration point.

In one embodiment, the backlight panel includes at least two light-emitting diodes;

the generation module includes:

a fourth acquisition unit, configured to acquire dimensions of the surface of the backlight panel, dimensions of each light-emitting diode and the position of each light-emitting diode on the backlight panel;

a dividing unit, configured to determine a first print area and a second print area of the at least two piezoelectric injection valves according to the dimensions of the surface of the backlight panel, wherein the first print area excludes the light-emitting diodes, the at least two piezoelectric injection valves are in an open state in the first print area, and the second print area includes all light-emitting diodes;

a processing unit, configured to determine positions where the at least two piezoelectric injection valves are in the closed state and positions where the at least two piezoelectric injection valves are in an open state in the second print area according to the dimensions of each light-emitting diode and the position of each light-emitting diode on the backlight panel; and a generation unit, configured to generate the moving paths of the at least two piezoelectric injection valves according to the print position of each of the at least two piezoelectric injection valves, the first print area, the positions where the at least two piezoelectric injection valves are in the closed state and the positions where the at least two piezoelectric injection valves are in the open state in the second print area.

In one embodiment, the device further includes:

a first regulation module, configured to determine print heights of the at least two piezoelectric injection valves according to the dimensions of the surface of the backlight panel, and regulate a distance between each of the at least two piezoelectric injection valves and the substrate according to the print heights of the at least two piezoelectric injection valves before the at least two corrected piezoelectric injection valves are controlled to print according to the moving paths.

In one embodiment, the device further includes:

a curing module, configured to perform curing on the printed reflecting layer of the backlight panel after the at least two corrected piezoelectric injection valves are controlled to print according to the moving paths.

In one embodiment, the device further includes:

a second cleaning module, configured to move the at least two piezoelectric injection valves to a cleaning area, and clean each piezoelectric injection valve after the at least two corrected piezoelectric injection valves are controlled to print according to the moving paths.

Those skilled in the art can clearly understand that the technical solutions in the embodiments of the present disclosure can be implemented by software and/or hardware. "Unit" and "module" in the specification refer to software and/or hardware which can perform specific functions independently or in cooperation with other components, wherein the hardware may be, for example, a field-programmable gate array (FPGA), an integrated circuit (IC) and the like.

Each processing unit and/or module in the embodiments of the present disclosure may be achieved by analog circuits that perform the functions in the embodiments of the present disclosure, or by the software that executes the functions in the embodiments of the present disclosure.

Figure 11:
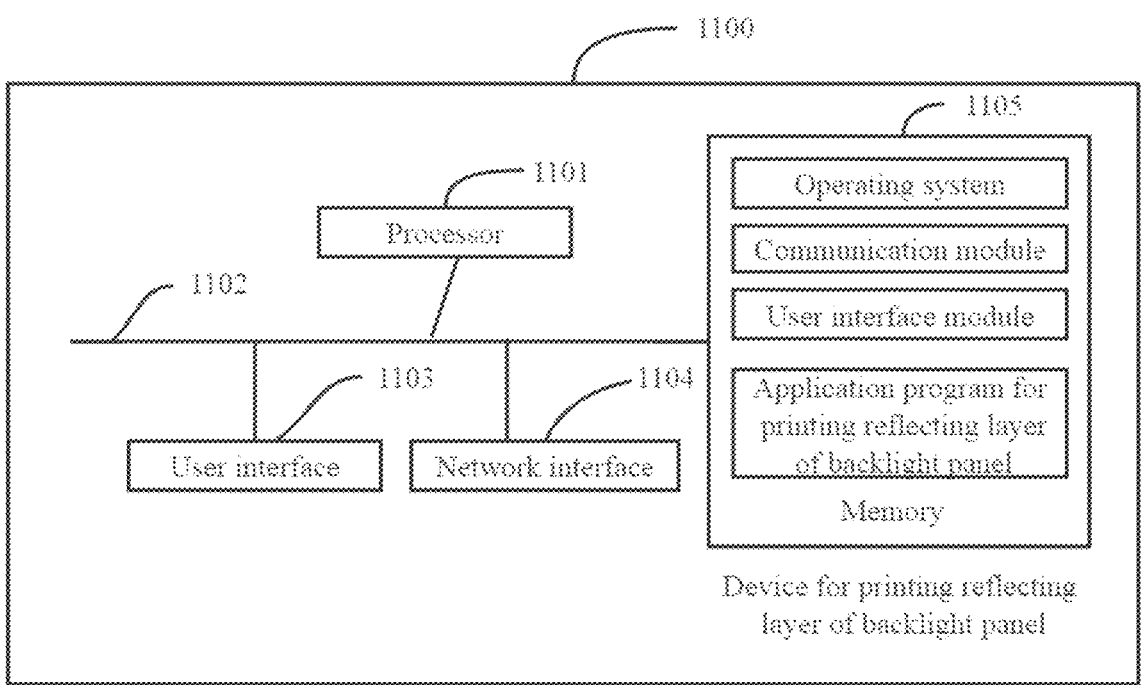
FIG. 11 is a structural schematic diagram of another device for printing a reflecting layer of a backlight panel provided by an embodiment of the present disclosure.

Referring to FIG. 11, FIG. 11 shows the structural schematic diagram of another device for printing the reflecting layer of the backlight panel provided by the embodiments of the present disclosure.

As shown in FIG. 11, the device for printing the reflecting layer of the backlight panel may include at least one processor 1101, at least one network interface 1104, a user interface 1103, a memory 1105 and at least one communication bus 1102.

Wherein, the communication bus 1102 may be configured to implement communication among the above assemblies.

Wherein, the user interface 1103 may include buttons, and optionally, a user interface may further include a standard wired interface and a standard wireless interface.

Wherein, the network interface 1104 may include, but is not limited to, a Bluetooth module, an NFC (near-field communication) module and a Wi-Fi module.

Wherein, the processor 1101 may include one or more processor cores. The processor 1101 is connected with each part in whole electronic equipment 1100 by various interfaces and circuits, and performs various functions of routing equipment 1100 and processes data via operation or execution of instruments, programs, code sets or instruction sets stored in the memory 1105, and calling of data stored in the memory 1105. Optionally, the processor 1101 may be implemented by at least one hardware form of DSP (digital signal processor), FPGA and PLA (programmable logic array). The processor 1101 may be integrated with one or a combination of more of CPU (central processing unit), GPU (graphics processing unit), modem and the like. Wherein, the CPU mainly processes an operating system, the user interface, disclosure programs and the like; the GPU is configured to render and plot contents required to show on a display screen; and the modem is configured to process wireless communication. It is understandable that the modem may also not be integrated with the processor 1101, but implemented by a chip independently.

Wherein, the memory 1105 may include a RAM (random access memory), or an ROM (read only memory). Optionally, the memory 1105 includes a non-transitory computer readable medium. The memory 1105 may be configured to store instructions, programs, codes, code sets or instruction sets. The memory 1105 may include a program storage area and a data storage area, wherein the program storage area may store instructions for implementing the operating system, instructions for performing at least one function (such as touch function, sound playing function and image playing function), instructions for implementing the above embodiment of each method and the like; and the data storage area may store data involved in the above embodiment of each method. The memory 1105 may also be optionally at least one storage device located far away from the above processor 1101. As shown in FIG. 11, the memory 1105, as a computer storage medium, may include the operating system, a network communication module, a user interface module and an disclosure program used for printing the reflecting layer of the backlight panel.

Specifically, the processor 1101 may be configured to call the disclosure program used for printing the reflecting layer of the backlight panel and stored in the memory 1105, and specifically execute the following operations:

first correction processing is performed on at least two piezoelectric injection valves;

specification parameters of the backlight panel are acquired, and moving paths of the at least two piezoelectric injection valves are generated according to the specification parameters of the backlight panel; and the at least two corrected piezoelectric injection valves are controlled to print according to the moving paths.

In one embodiment, the process of performing first correction processing on the at least two piezoelectric injection valves includes:

a distance between each of the at least two piezoelectric injection valves and a substrate is acquired based on a contact sensor, and the distance between each of the at least two piezoelectric injection valves and the substrate is controlled as a preset distance, wherein the substrate is used for supporting the backlight panel.

In one embodiment, the process of performing first correction processing on the at least two piezoelectric injection valves further includes:

shapes of nozzles of the at least two piezoelectric injection valves are acquired based on a first camera, and a distance between any two adjacent piezoelectric injection valves among the at least two piezoelectric injection valves is determined according to the shapes of the nozzles, wherein the first camera is arranged below the at least two piezoelectric injection valves; and the distance between any two adjacent piezoelectric injection valves is regulated according to a second preset distance.

In one embodiment, the process of performing first correction processing on the at least two piezoelectric injection valves further includes:

any one of the at least two piezoelectric injection valves is controlled to print a calibration point in a preset area;

the calibration point is identified based on a second camera, and an initial position of the piezoelectric injection valve corresponding to the calibration point is determined, wherein the second camera is arranged above the at least two piezoelectric injection valves; and an initial position of each of the at least two piezoelectric injection valves is determined according to the regulated distance between any two adjacent piezoelectric injection valves and the initial position of the piezoelectric injection valve corresponding to the calibration point.

In one embodiment, the at least two piezoelectric injection valves include at least two large-nozzle piezoelectric injection valves and at least two small-nozzle piezoelectric injection valves;

The process of performing first correction processing on the at least two piezoelectric injection valves further includes:

an adhesive quality of each large-nozzle piezoelectric injection valve is acquired within the same time interval, and whether the adhesive quality of each large-nozzle piezoelectric injection valve is consistent with a first preset mass is judged;

air pressure of each large-nozzle piezoelectric injection valve is regulated until the adhesive quality of each large-nozzle piezoelectric injection valve is consistent with the first preset mass if it is detected that the adhesive quality of each large-nozzle piezoelectric injection valve is not consistent with the first preset mass;

an adhesive quality of each small-nozzle piezoelectric injection valve is acquired within the same time interval, and whether the adhesive quality of each small-nozzle piezoelectric injection valve is consistent with a second preset mass is judged; and the air pressure of each small-nozzle piezoelectric injection valve is regulated until the adhesive quality of each small-nozzle piezoelectric injection valve is consistent with the second preset mass if it is detected that the adhesive quality of each small-nozzle piezoelectric injection valve is not consistent with the second preset mass.

In one embodiment, the process of performing first correction processing on the at least two piezoelectric injection valves further includes:

pre-heating is performed to the at least two piezoelectric injection valves so that the temperatures at the nozzles of the at least two piezoelectric injection valves are within a preset temperature interval.

In one embodiment, before the at least two corrected piezoelectric injection valves are controlled to print according to the moving paths, the method further includes:

a diluent with a first preset concentration is fused with a leveling agent with a second preset concentration, to obtain printing materials of the at least two corrected piezoelectric injection valves;

the process of controlling the at least two corrected piezoelectric injection valves to print according to the moving paths includes:

the at least two corrected piezoelectric injection valves are filled with the printing materials, and the at least two corrected piezoelectric injection valves are controlled to print according to the moving paths.

In one embodiment, before the at least two corrected piezoelectric injection valves are controlled to print according to the moving paths, the method further includes:

a surface of the backlight panel is cleaned.

In one embodiment, after the first correction processing is performed on the at least two piezoelectric injection valves, and before the specification parameters of the backlight panel are acquired and the moving paths of the at least two piezoelectric injection valves are generated according to the specification parameters of the backlight panel, the method further includes:

mark points on the backlight panel are identified based on the second camera, wherein at least two mark points on the backlight panel are provided;

whether a line formed by connecting any two adjacent mark points on the backlight panel is parallel to a calibration line set on a substrate is judged;

second correction processing is performed on the backlight panel until the line formed by connecting any two adjacent mark points on the backlight panel is parallel to the calibration line set on the substrate if it is determined that the line formed by connecting any two adjacent mark points on the backlight panel is not parallel to the calibration line set on the substrate; and a print position of the piezoelectric injection valve corresponding to the calibration point is determined according to the mark points of the corrected backlight panel, and a print position of each of the at least two piezoelectric injection valves is calculated according to the print position of the piezoelectric injection valve corresponding to the calibration point and the initial position of the piezoelectric injection valve corresponding to the calibration point.

In one embodiment, the backlight panel includes at least two light-emitting diodes;

Referring to FIG. 16, the process of acquiring the specification parameters of the backlight panel and generating the moving paths of the at least two piezoelectric injection valves according to the specification parameters of the backlight panel includes:

Step 602, dimensions of the surface of the backlight panel, dimensions of each light-emitting diode and the position of each light-emitting diode on the backlight panel are acquired;

Step 604, a first print area and a second print area of the at least two piezoelectric injection valves are determined according to the dimensions of the surface of the backlight panel, wherein the first print area excludes the light-emitting diodes, the at least two piezoelectric injection valves are in an open state in the first print area, and the second print area includes all light-emitting diodes;

Step 606, positions where the at least two piezoelectric injection valves are in the closed state and positions where the at least two piezoelectric injection valves are in an open state in the second print area are determined according to the dimensions of each light-emitting diode and the position of each light-emitting diode on the backlight panel; and Step 608, the moving paths of the at least two piezoelectric injection valves are generated according to the print position of each of the at least two piezoelectric injection valves, the first print area, the positions where the at least two piezoelectric injection valves are in the closed state and the positions where the at least two piezoelectric injection valves are in the open state in the second print area.

In one embodiment, before the at least two corrected piezoelectric injection valves are controlled to print according to the moving paths, the method further includes:

print heights of the at least two piezoelectric injection valves are determined according to the dimensions of the surface of the backlight panel, and a distance between each of the at least two piezoelectric injection valves and the substrate is regulated according to the print heights of the at least two piezoelectric injection valves.

In one embodiment, after the at least two corrected piezoelectric injection valves are controlled to print according to the moving paths, the method further includes:

curing is performed on the printed reflecting layer of the backlight panel.

In one embodiment, after the at least two corrected piezoelectric injection valves are controlled to print according to the moving paths, the method further includes:

the at least two piezoelectric injection valves are moved to a cleaning area, and each piezoelectric injection valve is cleaned.

The present disclosure further provides a computer readable storage medium on which computer programs are stored, and when executed by the processor, the computer programs implement the above method. Wherein, the computer readable storage medium may include, but is not limited to, any type of disks, including floppy disks, compact disks, DVD (Digital Video Disc), CD-ROM (Compact Disc Read-Only Memory), microdrives and magneto-optical disks, ROM (Read Only Memory), RAM (Random Access Memory), EPROM (Erasable Programmable Read-Only Memory), EEPROM (Electrically Erasable Programmable Read-Only Memory), DRAM (Dynamic Random Access Memory), VRAM (Video RAM), flash memories, magcards or optical cards, nanometer systems (including molecular memory IC), or any type of media or equipment suitable for storing instructions and data.

It should be noted that, for brief description, the above-mentioned embodiment of each method is described by a series of action combinations. However, those skilled in the art should know that the present disclosure is not limited to the described action sequence since some steps may be implemented in other orders or simultaneously depending on the disclosure. Next, those skilled in the art should also know that all embodiments described in the specification are preferred embodiments, and the involved actions and modules are not necessarily required for the present disclosure.

What the description of each of the above embodiments has focused on is different, and parts not described in detail in a certain embodiment may refer to relevant descriptions of other embodiments.

In some embodiments of the present disclosure, it should be understood that the disclosed device may be achieved in other manners. For example, the embodiments of the device described above are merely schematic; for example, the division of the units is merely the division of logic functions, and other division manners may be available during actual realization; for example, a plurality of units or assemblies may be combined or integrated with another system, or some features may be neglected, or not executed. Moreover, the displayed or discussed mutual coupling or direct coupling or communication connection may be indirect coupling or communication connection via some service interfaces, devices or units in electrical or other forms.

The units described as separate components may be or may not be physically separated, and components displayed as units may be or may not be physical units, may be located in one place, or may be distributed on a plurality of network units. Part or all of units may be selected according to actual requirements to achieve one of the objectives of the solution in the embodiment.

In addition, each function unit in each embodiment of the present disclosure may be integrated into one processing unit, or each unit is separate physically, or two or more units may be integrated into one unit. The above integrated units may be implemented in the form of hardware or software function units.

When implemented in the form of software function units and sold or used as independent products, the integrated units may be stored on the computer readable memory. Based on such understanding, the technical solution of the present disclosure essentially or the part making contribution to the prior art or all or part of the technical solutions may be shown in the form of a software product, and the computer software product is stored in one memory, including a plurality of instructions configured to enable computer equipment (which may be a personal computer, a server, network equipment or the like) to implement all or part of steps of the method in the embodiments of the present disclosure. While the aforementioned memory includes: USB flash drives, read-only memories (ROM), random access memories (RAM), mobile hard disk drives, magnetic disks, compact disks or other media on which program codes can be stored.

Those ordinarily skilled in the art can understand that all or part of steps in each method of the embodiments may be implemented by relevant hardware instructed by programs. The programs may be stored in a computer readable memory. The memory may include USB flash drives, read-only memories (ROM), random access memories (RAM), magnetic disks, compact disks or the like.

The above descriptions are merely the exemplary embodiments of the present disclosure, which cannot be construed as a limitation to the scope of the present disclosure. All equivalent variations and modifications made according to the instruction of the present disclosure still fall within the scope covered by the present disclosure. The embodiments of the present disclosure would be readily apparent to those skilled in the art from the consideration of the specification and the practice of the disclosure here. The present disclosure aims to cover any variations, purposes or adaptive changes. These variations, purposes or adaptive changes follow the general principles of the present disclosure, and include common general knowledge or conventional technical means in the art which are not recorded in the present disclosure. The specification and embodiments are merely regarded as exemplary, and the scope and spirit of the present disclosure are defined by the claims.

What is claimed is:

1. A method for printing a reflecting layer of a backlight panel, comprising:

performing first correction processing on at least two piezoelectric injection valves comprises:

acquiring a distance between each of the at least two piezoelectric injection valves and the backlight panel based on a contact sensor, and controlling the distance between each of the at least two piezoelectric injection valves and the backlight panel as a first preset distance;

acquiring shapes of nozzles of the at least two piezoelectric injection valves based on a first camera, and determining a distance between any two adjacent piezoelectric injection valves among the at least two piezoelectric injection valves according to the shapes of the nozzles, wherein the first camera is arranged below the at least two piezoelectric injection valves;

regulating the distance between any two adjacent piezoelectric injection valves according to a second preset distance;

controlling any one of the at least two piezoelectric injection valves to print a calibration point in a preset area;

identifying the calibration point based on a second camera, and determining an initial position of the piezoelectric injection valve corresponding to the calibration point, wherein the second camera is arranged above the at least two piezoelectric injection valves; and determining an initial position of each of the at least two piezoelectric injection valves according to the regulated distance between any two adjacent piezoelectric injection valves and the initial position of the piezoelectric injection valve corresponding to the calibration point;

identifying mark points on the backlight panel based on the second camera, wherein at least two mark points on the backlight panel are provided;

judging whether a line formed by connecting any two adjacent mark points on the backlight panel is parallel with a calibration line set on a substrate, wherein the substrate is used for supporting the backlight panel;

performing second correction processing on the backlight panel until the line formed by connecting any two adjacent mark points on the backlight panel is parallel to the calibration line set on the substrate if determining that the line formed by connecting any two adjacent mark points on the backlight panel is not parallel to the calibration line set on the substrate; and determining a print position of the piezoelectric injection valve corresponding to the calibration point according to the mark points on the corrected backlight panel, and calculating a print position of each of the at least two piezoelectric injection valves according to the print position of the piezoelectric injection valve corresponding to the calibration point and the initial position of the piezoelectric injection valve corresponding to the calibration point;

acquiring specification parameters of the backlight panel, and generating moving paths of the at least two piezoelectric injection valves according to the specification parameters of the backlight panel; the specification parameters of the backlight panel include dimensions of a surface of the backlight panel, dimensions of each light-emitting diode, and a position of each light-emitting diode on the backlight panel;

controlling the at least two corrected piezoelectric injection valves to print according to the moving paths.

2. The method according to claim 1, characterized in that the backlight panel comprises at least two light-emitting diodes;

the process of acquiring the specification parameters of the backlight panel and generating the moving paths of the at least two piezoelectric injection valves according to the specification parameters of the backlight panel comprises:

acquiring dimensions of a surface of the backlight panel, dimensions of each light-emitting diode and a position of each light-emitting diode on the backlight panel;

determining a first print area and a second print area of the at least two piezoelectric injection valves according to the dimensions of the surface of the backlight panel, wherein the first print area excludes the light-emitting diodes, the at least two piezoelectric injection valves are in an open state in the first print area, and the second print area includes all light-emitting diodes;

determining positions where the at least two piezoelectric injection valves are in a closed state and positions where the at least two piezoelectric injection valves are in the open state in the second print area according to the dimensions of each light-emitting diode and the position of each light-emitting diode on the backlight panel; and generating the moving paths of the at least two piezoelectric injection valves according to the print position of each of the at least two piezoelectric injection valves, the first print area, the positions where the at least two piezoelectric injection valves are in the closed state and the positions where the at least two piezoelectric injection valves are in the open state in the second print area.

3. The method according to claim 1, characterized in that the method is implemented before a die bonding process of the backlight panel; or the method is implemented after the die bonding process of the backlight panel.

4. The method according to claim 1, characterized in that the at least two piezoelectric injection valves comprise at least two large-nozzle piezoelectric injection valves and at least two small-nozzle piezoelectric injection valves;

the process of performing first correction processing on the at least two piezoelectric injection valves further comprises:

acquiring an adhesive quality of each large-nozzle piezoelectric injection valve within the same time interval, and judging whether the adhesive quality of each large-nozzle piezoelectric injection valve is consistent with a first preset mass;

regulating air pressure of each large-nozzle piezoelectric injection valve the adhesive quality of each large-nozzle piezoelectric injection valve is consistent with the first preset mass if detecting that the adhesive quality of each large-nozzle piezoelectric injection valve is not consistent with the first preset mass;

acquiring an adhesive quality of each small-nozzle piezoelectric injection valve within the same time interval, and judging whether the adhesive quality of each small-nozzle piezoelectric injection valve is consistent with a second preset mass; and regulating air pressure of each small-nozzle piezoelectric injection valve the adhesive quality of each small-nozzle piezoelectric injection valve is consistent with the second preset mass if detecting that the adhesive quality of each small-nozzle piezoelectric injection valve is not consistent with the second preset mass.

5. The method according to claim 1, characterized in that the process of performing first correction processing on the at least two piezoelectric injection valves further comprises: performing pre-heating on the at least two piezoelectric injection valves so that temperatures at the nozzles of the at least two piezoelectric injection valves are within a preset temperature interval.

6. A device for printing a reflecting layer of a backlight panel, comprising:

a first processing module, configured to perform first correction processing on at least two piezoelectric injection valves; the first processing module includes:

a first control unit, configured to acquire a distance between each of the at least two piezoelectric injection valves and a substrate based on a contact sensor, and control the distance between each of the at least two piezoelectric injection valves and the substrate as a first preset distance, wherein the substrate is used for supporting the backlight panel;

a first acquisition unit, configured to acquire shapes of nozzles of the at least two piezoelectric injection valves based on a first camera, and determine a distance between any two adjacent piezoelectric injection valves among the at least two piezoelectric injection valves according to the shapes of the nozzles;

a second control unit, configured to regulate the distance between any two adjacent piezoelectric injection valves according to a second preset distance;

a print unit, configured to control any one of the at least two piezoelectric injection valves to print a calibration point in a preset area;

an identification unit, configured to identify the calibration point based on a second camera, and determine an initial position of the piezoelectric injection valve corresponding to the calibration point; and a third control unit, configured to determine an initial position of each of the at least two piezoelectric injection valves according to the regulated distance between any two adjacent piezoelectric injection valves and the initial position of the piezoelectric injection valve corresponding to the calibration point;

an identification module, configured to identify mark points on the backlight panel based on the second camera after first correction processing is performed on the at least two piezoelectric injection valves, and before the specification parameters of the backlight panel are acquired, and the moving paths of the at least two piezoelectric injection valves are generated according to the specification parameters of the backlight panel, wherein at least two mark points on the backlight panel are provided;

a judgment module, configured to judge whether a line formed by connecting any two adjacent mark points on the backlight panel is parallel to a calibration line set on a substrate, wherein the substrate is used for supporting the backlight panel;

a second processing module, configured to perform second correction processing on the backlight panel till the line formed by connecting any two adjacent mark points on the backlight panel is parallel to the calibration line set on the substrate if it is determined that the line formed by connecting any two adjacent mark points on the backlight panel is not parallel to the calibration line set on the substrate; and a calculation module, configured to determine a print position of the piezoelectric injection valve corresponding to the calibration point according to the mark points of the corrected backlight panel, and calculate a print position of each of the at least two piezoelectric injection valves according to the print position of the piezoelectric injection valve corresponding to the calibration point and the initial position of the piezoelectric injection valve corresponding to the calibration point;

a generation module, configured to acquire specification parameters of the backlight panel, and generate moving paths of the at least two piezoelectric injection valves according to the specification parameters of the backlight panel; the specification parameters of the backlight panel include dimensions of a surface of the backlight panel, dimensions of each light-emitting diode, and a position of each light-emitting diode on the backlight panel; and a print module, configured to control the at least two corrected piezoelectric injection valves to print according to the moving paths.

* * * * *